United States Patent
Omohundro et al.

(10) Patent No.: US 11,865,913 B2
(45) Date of Patent: Jan. 9, 2024

(54) VEHICLE LEAD CONTROL

(71) Applicant: Zimeno, Inc., Livermore, CA (US)

(72) Inventors: Zachary Meyer Omohundro, Livermore, CA (US); Karan Kaushik, Dublin, CA (US); Uriel Aparecido Rosa, Dublin, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/164,540

(22) Filed: Feb. 3, 2023

(65) Prior Publication Data

US 2023/0249546 A1 Aug. 10, 2023

Related U.S. Application Data

(60) Provisional application No. 63/306,656, filed on Feb. 4, 2022.

(51) Int. Cl.
*B60K 23/08* (2006.01)

(52) U.S. Cl.
CPC .. *B60K 23/0808* (2013.01); *B60K 2023/0858* (2013.01); *B60W 2556/45* (2020.02); *B60W 2720/403* (2013.01); *B60Y 2200/221* (2013.01)

(58) Field of Classification Search
CPC ........ B60K 23/0808; B60K 2023/0858; B60Y 2200/221; B60W 2720/403; B60W 2520/403; B60W 2556/45
See application file for complete search history.

(56) References Cited

U.S. PATENT DOCUMENTS

| | | |
|---|---|---|
| 5,924,951 A | 7/1999 | Winzeler et al. |
| 6,109,384 A | 8/2000 | Bromely et al. |
| 8,960,341 B2 | 2/2015 | Weber |
| 2001/0047234 A1 | 11/2001 | Tanaka |
| 2005/0006164 A1 | 1/2005 | Teraoka |
| 2005/0087378 A1 | 4/2005 | Hrazdera |
| 2006/0175113 A1 | 8/2006 | Rodeghiero |
| 2008/0257570 A1 | 10/2008 | Keplinger et al. |

(Continued)

FOREIGN PATENT DOCUMENTS

WO WO-2016185019 A1 * 11/2016 ............. B60K 28/16

OTHER PUBLICATIONS

Rosa, U.A. & Upadhyaya, S.D. & Chen, P.. (2000). Modeling and verification of an auto front-wheel-drive system. Transactions of the ASAE. 43. 23-29. 10.13031/2013.2683.

(Continued)

*Primary Examiner* — Justin Holmes
(74) *Attorney, Agent, or Firm* — Rathe Lindenbaum LLP

(57) ABSTRACT

A vehicle may include rear ground traction members, front ground traction members, a rear drive system to drive the rear ground traction members, a continuously variable speed front drive system to drive the front ground traction members, a rear speed sensor to output rear speeds of the rear ground traction members, a front speed sensor to output front speeds of the front ground traction members, and a controller to select a chosen lead for a rear speed of the rear ground traction members based on evaluations of different tractive efficiencies for different leads for the rear speed. The controller may further output control signals to the continuously variable speed front drive system to drive the front ground traction members at the chosen lead.

20 Claims, 12 Drawing Sheets

(56) References Cited

U.S. PATENT DOCUMENTS

| | | |
|---|---|---|
| 2011/0022267 A1 | 1/2011 | Murphy |
| 2018/0211454 A1* | 7/2018 | Carlson .................. F16H 63/50 |
| 2018/0244257 A1 | 8/2018 | Kneitz et al. |
| 2019/0100203 A1* | 4/2019 | Imamura .............. B60W 10/119 |
| 2019/0126759 A1* | 5/2019 | Miller ................. B60L 15/2009 |

OTHER PUBLICATIONS

Upadhyaya, S.K. & Rosa, U.A. & Josia, M.N., & Koller, M., "Effect of Belt Width and Grouser Wear on th Tractive Characteristics of Rubber-Tracked Vehicles", Applied enginnering in Agriculture Vo. 17(3), 267-271 (2001).

PCT Search Report for PCT/US2023/012346 dated Apr. 14, 2023.

\* cited by examiner

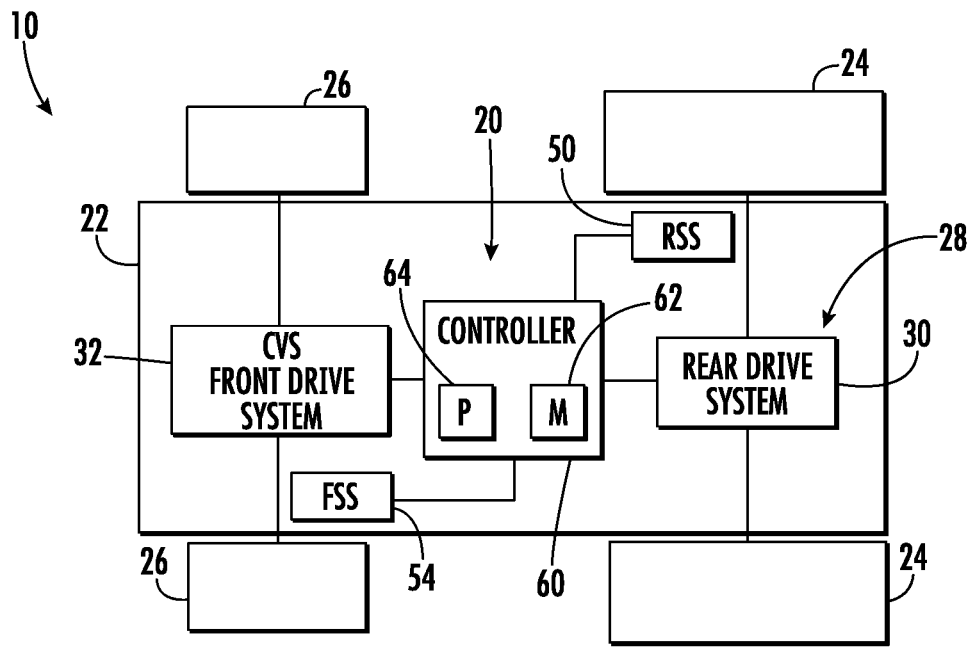
FIG. 1
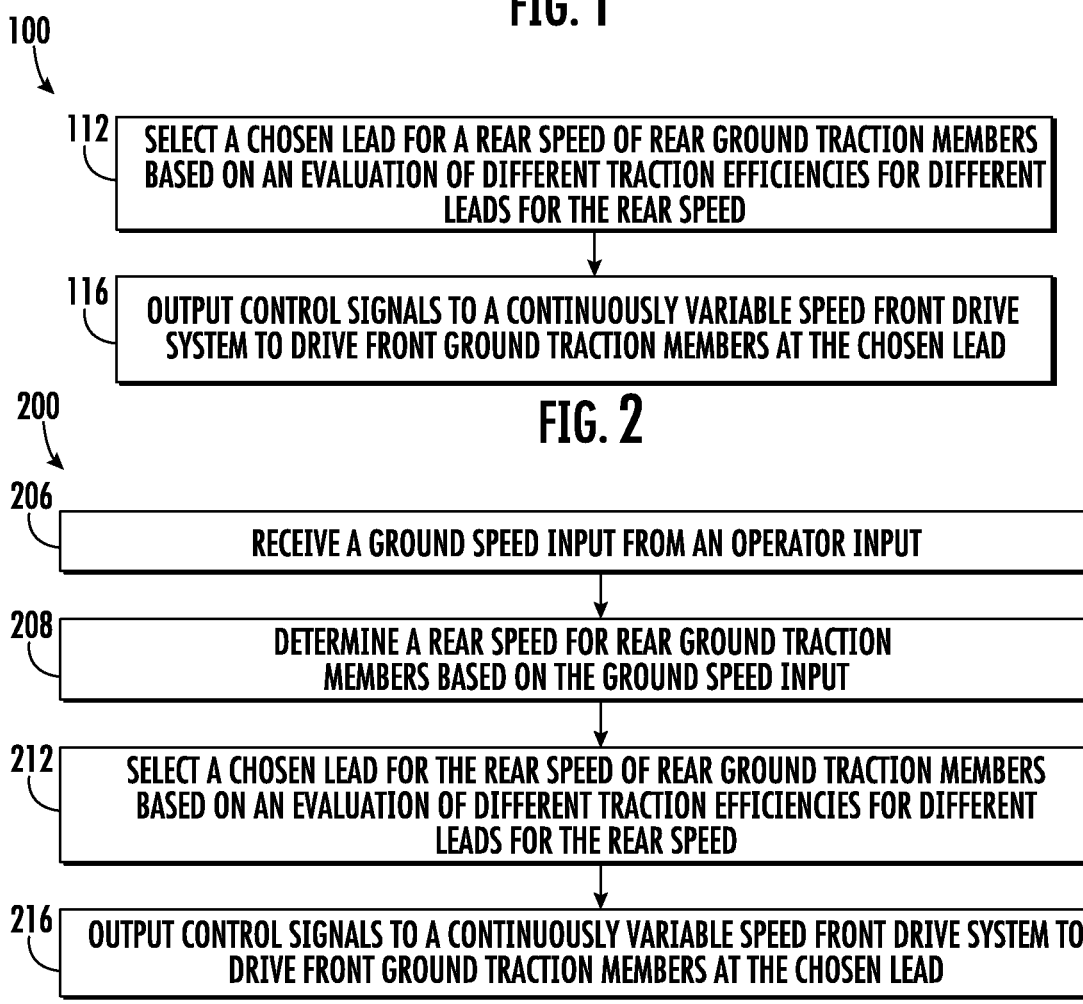
FIG. 2
FIG. 5

VEHICLE LEAD CONTROL

CROSS-REFERENCE TO RELATED PATENT APPLICATIONS

The present non-provisional patent application claims priority under 35 USC 119 from U.S. provisional Patent Application Ser. No. 63/307,016 filed on Feb. 4, 2022, by Omohundro et al. and entitled SLIP CONTROL, the full disclosure of which is hereby incorporated by reference.

BACKGROUND

A vehicle "lead" refers to the rotational speed of the front wheels or other front traction members of the vehicle, relative to the rotational speed at which the rear wheels or other rear traction members of the vehicle are driven. In many vehicles, the front wheels (tires) have a smaller diameter than the rear wheels. As a result, the front wheels must rotate faster to cover the same distance as rear wheels. Many vehicles utilize a fixed mechanical ratio between the rear wheels and the front wheels to establish a fixed lead based upon wheel size.

BRIEF DESCRIPTION OF THE DRAWINGS

FIG. 1 is a diagram having an example lead control system.

FIG. 2 is a flow diagram of an example method that may be carried out by the example vehicle of FIG. 1.

FIG. 5 is a flow diagram of an example method that may be carried out by the vehicle of FIG. 1.

Figure 3:
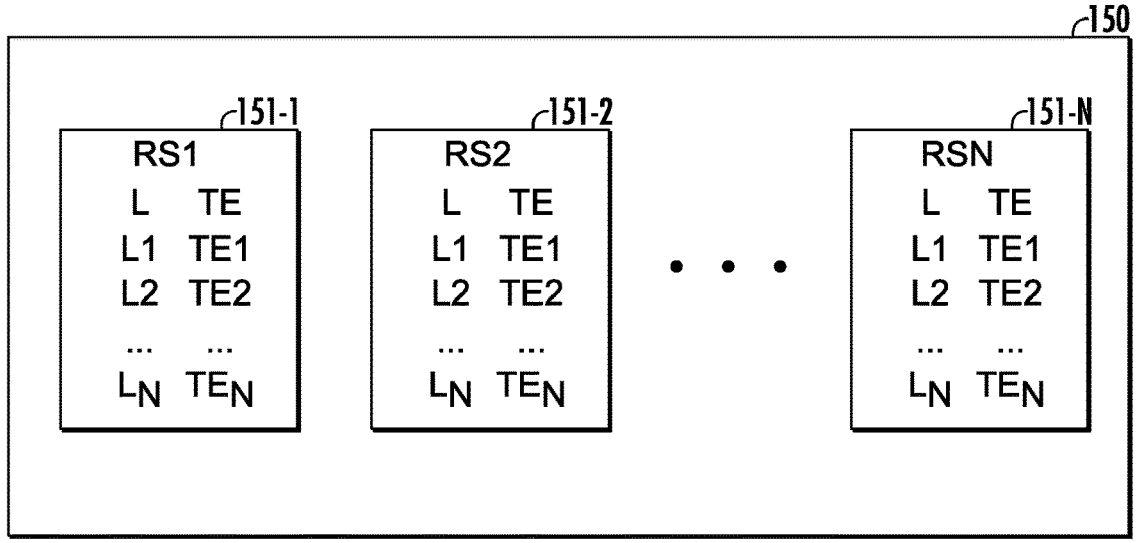
FIG. 3 is a diagram schematically illustrating an example database of leads and corresponding tractive efficiencies for different rear speeds, wherein the database may be used by the vehicle of FIG. 1.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicles and methods for controlling and adjusting the lead of a vehicle to enhance tractive efficiencies of a vehicle. Disclosed is an example vehicle having a controller that determines and selects a chosen lead for a given rear speed of the rear ground traction members based upon evaluations of different tractive efficiencies for different leads for the rear speed. In some implementations, the controller automatically outputs control signals to cause the front ground traction members to be driven at the chosen lead. In some implementations, the controller outputs a recommendation for the chosen lead to an operator and awaits the operator input or authorization before operating the vehicle with the chosen lead.

For purposes of this disclosure, "tractive efficiency" refers to the efficiency at which the vehicle converts power into the actual ground speed of the vehicle with a corresponding pulling force. The power being converted may be determined based upon the torque applied to the ground engaging members of the vehicle and the speed at which the ground engaging traction members are driven (referred to as wheel speed).

The ground speed of the vehicle refers to the actual speed at which the vehicle is traveling. The ground speed may be determined using signals from sensors such as GPS based sensors or radar/Doppler based sensors.

The pulling force may be referred to as the draft of the vehicle. The pulling force may depend upon the weight of the implement being pulled by the vehicle and any interactions of the implement with the terrain. The pulling force or draft of the vehicle may be determined based upon signals from a draft sensor.

The torque refers to the force or amount of torque utilized to drive the traction members or wheels. In some implementations, torque may be determined using a strain sensor. In some implementations where the ground traction members are electrically driven with a motor (such as with the motor directly driving the wheels or the motor driving a hydraulic pump which drives a hydraulic motor to drive the wheels), torque may be determined based upon electrical current drawn by the motor. In those implementations where the ground traction members are driven by a hydraulic motor, torque may be determined based upon signals from sensors that measure hydraulic pressure. The wheel speed refers to the rotational speed at which the rear ground traction members are being driven (for example, revolutions per minute (RPM)). In some implementations, tractive efficiency may be determined based upon the following formula: (Ground speed*draft)/(torque*wheel speed).

In some implementations, tractive efficiency may be determined based upon a measurement of fuel or battery power consumption for a particular lead when other external factors are maintained constant. The power being converted is a measurement related to the fuel or battery power consumption. In such an implementation, tractive efficiency may be determined by evaluating how much fuel or battery power was consumed by the vehicle to pull an implement, providing a given load or draft, at a particular ground speed. This evaluation may be done for each evaluated wheel speed and each of the leads being evaluated for each wheel speeds. The results may be recorded to form a database of leads and tractive efficiencies for different wheel speeds. As described hereafter, the results may be further conditioned or based on variations in the implement being towed (variations in the draft) and/or variations with respect to the underlying terrain.

In some implementations, the rear speed for which a particular lead for the front ground traction members is chosen is based upon a ground speed input from an operator. The operator, using a ground speed input, such as a pedal, lever, touchscreen, switch, slide bar, mouse and screen or other input device may enter a chosen ground speed, the speed at which the vehicle itself is to travel or traverse a terrain. Based upon this entered or input ground speed, the controller may determine the rear speed for the rear ground traction members. The controller may then evaluate the tractive efficiencies for multiple different leads of the front ground traction members for the rear speed to determine which of the different leads should be chosen. For example, at a particular rear speed RS1, the vehicle may have: (1) a first tractive efficiency TE1 when the front speed has a first lead L1 relative to the rear speed RS1; (2) a second tractive efficiency TE2, greater than TE1, when the front speed has a second lead L2 relative to the rear speed RS1; (3) a tractive efficiency TE3, less than TE1, when front speed has a third lead L3 relative to the rear speed RS1. In response to the operator selecting a ground speed having the corresponding RS1, the controller may select the particular lead having the greatest tractive efficiency, in this example, lead L2 for the speed RS1.

In some implementations, the controller may choose the lead having the greatest tractive efficiency. In some implementations, the controller may choose the lead based upon additional factors, such as energy consumption. In some implementations, evaluations or comparisons of the different tractive efficiency for different leads for different particular rear speeds may be pre-performed for specific vehicle configurations and ground conditions, wherein the controller simply identifies the individual pre-chosen lead associated with the given rear speed.

In some implementations, the chosen lead and the rear speed are both selected by the controller based upon evaluations of different tractive efficiencies for different leads. In other words, the controller may choose a lead having the greatest tractive efficiency across multiple available rear speeds. Different rear speeds may have different associated optimal tractive efficiency leads. The tractive efficiencies amongst the different optimal tractive efficiency leads may vary. The controller may compare the different tractive efficiencies amongst the different optimal tractive efficiency leads to identify which optimal tractive efficiency lead (and which associated rear speed) has the greatest tractive efficiency.

For example, at a rear speed RS1, the vehicle may have the greatest tractive efficiency TE1 with a particular lead L1. At a speed RS2, the vehicle may have the greatest tractive efficiency TE2 at a particular lead L2. The tractive efficiency TE2 may be greater than the tractive efficiency TE1. Based upon this comparison, the controller may automatically select RS2 and lead L2 for the vehicle operation to achieve the greatest tractive efficiency TE2.

In some implementations, the vehicle may comprise a database comprising the evaluations of different tractive efficiencies for different leads for each of multiple different rear speeds. In some implementations, the controller is configured to select the chosen lead additionally based upon the geographic location of the vehicle. In some implementations, the vehicle may comprise a lead map that identifies different recommended leads for a given rear speed at different geographic locations. In such an implementation, the controller is configured to consult the lead map based upon the current geographic location of the vehicle.

In some implementations, the controller is configured to select the chosen lead additionally based upon a current condition and such or type of terrain underlying the vehicle. The condition (moisture content) or type of the underlying terrain may have an impact upon the tractive efficiencies of different leads. For a first soil type or condition, an optimal tractive efficiency may be achieved with a first lead when the rear traction members or wheels of the vehicle or at a particular rear speed. For a second soil type or condition, different than the first soil type or condition, the optimal tractive efficiency may be achieved with a second lead, different than the first lead, when the rear traction members or wheels of the vehicle are at the particular rear speed. In some implementations, the vehicle may include a sensor to sense the current condition and such or type of terrain underlying the vehicle. In some implementations, the vehicle may include and the controller may consult a terrain map identifying different conditions and/or types of terrain at different geographic locations, wherein the controller is configured to consult the terrain map based upon the current geographic location of the vehicle to determine the current and/or type of the underlying terrain.

In some implementations, the chosen lead may be additionally based upon a current draft of the vehicle. The draft of the vehicle refers to the towing or pulling force being exerted by the vehicle to pull an implement or attachment. The current draft of the vehicle may have an impact upon the tractive efficiencies of different leads. For a first draft, an optimal tractive efficiency may be achieved with a first lead when the rear traction members or wheels of the vehicle or at a particular rear speed. For a second draft, different than the first draft, the optimal tractive efficiency may be achieved with a second lead, different than the first lead, when the rear traction members or wheels of the vehicle are at the particular rear speed. The controller may select the chosen lead based upon which particular lead for the current draft has the optimal tractive efficiency.

In some implementations, the draft of the vehicle may be sensed. In some implementations, the draft of the vehicle may be determined based upon the current implement being pulled or towed by the vehicle or the current state of the implement being pulled or towed. The state of the vehicle being pulled or towed may refer to whether the implement is raised or lowered, is engaging the ground or carrying out a particular operation. In some implementations, the vehicle may include a sensor to detect an identity, or an operational state of the implement being towed and then identify a corresponding draft associated with the identified identity or operational state of the implement. In some implementations, an operator may input a value for the draft or an identity of the implement and/or its state, wherein the chosen lead is based upon the identification of the implement or its state.

In some implementations, the controller may select the chosen lead based upon which particular lead for the current draft and the current soil type and/or condition has the optimal tractive efficiency. In some implementations, the vehicle may include or have access to a database or table which, for each of a plurality of different rear speeds, tire pressures, different drafts (or different implements), and different soil type and/or conditions, provides a lead value identified as having the optimal tractive efficiency. In some implementations, the database may be more detailed, including multiple lead values and associated tractive efficiencies for each individual rear speed with a given draft and with a given soil condition and/or type.

In some implementations, the controller may be configured to determine and record, in real-time, different tractive efficiencies for different leads for each of multiple different rear speeds of the vehicle. In some implementations, the vehicle may comprise a ground speed sensor to output signals indicating a ground speed of the vehicle and a torque sensor to output signals indicating torque applied to the rear ground traction members and the front ground traction members. In some implementations, the torque value used for determining different tractive efficiencies may be determined based upon electrical currents drawn by an electric motor that directly or indirectly drives the ground traction members. In some implementations, the draft value used for determining the different tractive efficiencies may be input by an operator, directly sensed, such as with a draft sensor, or determined based upon an identification of an implement or attachment being pulled by the vehicle (and/or its state), wherein the identification of the implement or attachment (and/or its state) is either input by an operator or sensed.

In some implementations, the controller may adjust the rear speed of the vehicle, wherein for each individual rear speed of the vehicle, the controller may further adjust the speed of the front ground traction members or wheels to provide different leads. For each of the leads at each individual rear speed, the controller may utilize ground speed, draft, torque and wheel speed data (discussed above) to determine the resulting tractive efficiency. In such an implementation, the controller may generate a table or database identifying different tractive efficiencies for different leads for each of the different rear speeds.

In some implementations, the controller may record the different tractive efficiencies for the different leads for each of the different rear speeds with different draft values, such as when the vehicle is pulling different implements, producing a database that further takes into account the particular draft being pulled by the vehicle. In some implementations, the controller may record the different tractive efficiencies for the different leads for each of the different rear speeds when the vehicle traveling at different geographic locations or is traveling across different terrains having different soil conditions and/or types, producing a database that further takes into account the particular terrain or condition of the underlying terrain or soil. Such databases may be subsequently utilized by other vehicles of the same type or may be used as a basis for the selection of chosen leads the other different types of vehicles.

Disclosed is an example vehicle having controller that determines a geographic location of the vehicle and adjusts the lead of the vehicle based on the geographical location of the vehicle. In some implementations, the geographical location is utilized to consult a map to determine a soil type and/or condition. The lead of the vehicle is based on the soil type and/or condition.

In some implementations, an example vehicle directly senses soil type and/or condition. Based on the soil type and/or condition, a controller adjusts the lead of the vehicle.

Disclosed is an example vehicle that comprises a propulsion system. The propulsion system comprises an electric motor and a transaxle operably coupled to the electric motor. The transaxle has a first portion coupled to rear ground traction members to rotatably drive the rear ground traction members. The propulsion system further includes a hydraulic pump driven by the electric motor, a hydraulic motor driven by the hydraulic pump and a planetary gear assembly. The planetary gear assembly comprises a sun gear coupled to and driven by the hydraulic motor, a ring gear coupled to the transaxle for being driven by the electric motor; and a planet carrier carrying planet gears intermeshing between the ring gear and the sun gear. The planet carrier has an output shaft operably coupled to the front ground traction members to drive the front ground traction members.

In some implementations, the vehicle comprises a controller that is configured to modulate the hydraulic motor to control the lead of the vehicle. In some implementations, the controller is configured to perform comparisons of different ground speeds of the vehicle at different rotational speeds of the front ground traction members and to modulate the hydraulic motor to control the vehicle lead based upon the comparisons. In some implementations, the vehicle comprises a soil sensing system that senses a soil type and such or condition, wherein the controller is configured to modulate the hydraulic motor to control the vehicle lead based upon a combination of the comparisons and the sensed soil type and such or condition.

In other implementations, such implementations may alternatively or additionally provide an operator with the ability to the vehicle measures traction and/or automatically selects and executes a vehicle lead based upon such tractions or traction levels. In other words, traction, rather than traction efficiency, is the target variable. Lead will be selected to optimize the traction, rather than the traction efficiency, for the vehicle.

Maximum traction can be determined, similarly, but based on the maximum readings of the draft sensor until the draft stops increasing and levels off or goes down. Maximum traction, or coefficient of traction, can be useful in momentary situations for the vehicle to deal with patches of hard soil. In such example implementations, a lead control system may be operable in a operator selectable mode in which the system consults databases or tables, wherein the targeted variable is traction rather than traction efficiency. The system may automatically output control signals causing the vehicle to provide a particular lead at a particular rear speed to achieve an optimum or maximum traction for the vehicle. The database or tables may be based upon a single variable, such as rear speed (combined with default or standard variables such as draft, implement type or state, geographic region, tire pressure or terrain) or may be based upon combinations of multiple variables comprising one or more of rear speed, draft, implement type or state, geographic region, tire pressure and terrain.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

FIG. 1 is a diagram illustrating portions of an example vehicle 10 comprising an example vehicle lead control system 20. Vehicle lead control system 20 facilitates the adjustment of the lead of vehicle 10 to enhance tractive efficiencies of vehicle 10. Vehicle 10 comprises a frame 22 supporting rear ground traction members 24, front ground traction members 26, and a propulsion system 28 comprising a rear drive system 30 and a continuously variable speed front drive system 32.

Frame 22 forms a part of a chassis of vehicle 10 and supports the remaining components of vehicle 10. Rear ground traction members 24 are located near a rear of frame 22 and engage the underlying terrain or ground during driving of vehicle 10. In some implementations, rear ground traction members 24 comprise wheels. In other implementations, rear ground traction members 24 may comprise track members (driven ground engaging belts).

Front ground traction members 26 are located near the front of frame 22. In some implementations, front ground traction members 26 are configured to be steered to control the direction in which vehicle 10 travels. Front ground traction members 26 engage the underlying terrain or ground. In some implementations, front ground traction members 26 comprise wheels. In other implementations, front ground traction members 26 may comprise track members (driven ground engaging belts).

Propulsion system 28 comprises the mechanism of vehicle 10 configured to propel or drive vehicle 10 in a forward direction or reverse direction, depending upon the state of an associated transmission. Propulsion system 28 may rely upon stored electrical energy, generated electrical energy and/or mechanical energy derived from an internal combustion engine. Propulsion system 28 may comprise at least one battery and at least one electric motor for propelling vehicle 10. Propulsion system 28 may comprise at least one hydraulic pump and at least one hydraulic motor for propelling vehicle 10. Propulsion system 28 may comprise an internal combustion engine.

Rear drive system 30 comprises that portion of the propulsion system 28 configured to rotatably drive rear ground traction members 24. The continuously variable speed front drive system 32 comprises that portion of propulsion system 28 configured to rotatably drive the front ground traction members 26. Front drive system 32 is configured to disproportionally increase or decrease the rotational speed of front ground traction members 26 relative to the rotational speed at which rear ground traction members 24 are driven by rear drive system 30. Front drive system 32 is continuously variable in that the rotational speed at which the front ground traction members 26 are rotatably driven may be selectively adjusted to any one of a continuum of different rotational speeds within a range of speeds. Front drive system 32 facilitates the adjustment of vehicle lead, the adjustment of the rotational speed of the front wheels of the vehicle relative to the rotational speed at which the rear wheels of the vehicle are driven.

Vehicle lead control system 20 comprises rear speed sensor 50, front speed sensor 54, and controller 60. Rear speed sensor 50 comprise a sensor configured to output signals indicating a current rotational speed at which rear drive system 30 is rotatably driving rear ground traction members 24. Such signals may directly indicate the sensed rotational velocity of rear ground traction members 24 or may be indirectly indicate the sensed rotational velocity of the rear ground traction members 24, wherein the rotational velocity may be derived from such signals by controller 60. In one example implementation, rear speed sensor 50 may comprise what is commercially available as a "wheel speed sensor" or "vehicle speed sensor". Such a wheel speed sensors may comprise a toothed ring and pickup sized to read the speed of vehicle wheel rotation. Such sensors may utilize optics, magnetics or other mechanisms.

Front speed sensor 54 is similar to rear speed sensor 50 except that front speed sensor 54 comprises a sensor configured to output signals indicating a current rotational speed at which the continuously variable speed front drive system 32 is rotatably driving the front ground traction members 26. Such signals may directly indicate the sensed rotational velocity of front ground traction members 26 or may be indirectly indicate the sensed rotational velocity of the front ground traction members 26, wherein the rotational velocity may be derived from such signals by controller 60. In one example implementation, front speed sensor 54 may comprise what is commercially available as a "wheel speed sensor" or "vehicle speed sensor". Such a wheel speed sensors may comprise a toothed ring and pickup sized to read the speed of vehicle wheel rotation. Such sensors may utilize optics, magnetics or other mechanisms.

Controller 60 receives signals from sensors 50 and 54. Controller 60 comprises memory 62 and processor 64. Memory 62 comprises a non-transitory computer-readable medium containing instructions for directing processor 64. Processor 64 comprises a processing unit configured to follow such instruction contained in memory 62 and carry out the example method 100 outlined in FIG. 2.

As indicated by block 112 in FIG. 2, instructions in memory 62 direct processor 64 to determine and select a chosen lead for a given rear speed of the rear ground traction members 24 based upon evaluations of different tractive efficiencies for different leads for the rear speed. FIG. 3 illustrates an example database 150 containing previously determined tractive efficiency determinations for different candidate leads for the different rear speeds, the speeds at which the rear ground traction members 24 are being driven. As shown by FIG. 3, for the rear speeds RS1, RS2 . . . $RS_N$, the database comprises tables 151-1, 152-2 . . . 151-N, respectively, identifying the previously determined tractive efficiencies TEs for each candidate lead L. For example, when the rear ground traction members 24 are driven at a rear speed RS2, driving the front ground traction members 26 with the lead L1 in table 151-2 will result in an estimated tractive efficiency of TE1 and table 151-2. For each individual RS, there may exist a particular lead L associated with the greatest tractive efficiency TE. In the circumstance where the rear ground traction members or wheels 24 of vehicle 10 are being driven at the rear speed RS2 controller 60 may select the particular lead in table 151-2 having the greatest tractive efficiency TE as the chosen lead. In circumstances where the rear ground traction members of wheel 24 of vehicle 10 are being driven at the rear speed RS1, controller 60 may select the particular lead having the greatest tractive efficiency TE in table 151-1 as chosen lead.

Figure 4:
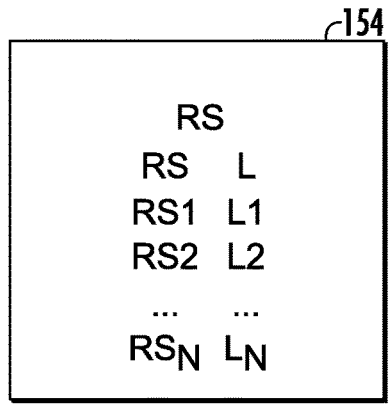
FIG. 4 is a diagram schematically illustrating an example table of optimum leads (those having the greatest tractive efficiencies) at different rear speeds, wherein the database may be used by the vehicle of FIG. 1.

As shown by FIG. 4, in some implementations, database 150 may be simplified so as to comprise a single table 154 providing the particular lead L having the optimum or maximum tractive efficiency for each rear speeds RS. In other words, the comparison of the different tractive efficiencies for a particular rear speed RS has been previously made and incorporated into the refined table 154. In such an implementation, controller 60 may consult table 154 and select the chosen lead by identifying the particular lead L in table 154 that corresponds to the current rear speed at which the rear ground traction members 24 are being driven.

As indicated by block 116, instructions in memory 62 direct processor 64 to output control signals to the continuously variable speed front drive system 32 to drive the front ground traction members 26 at the chosen lead, at the selected rotational speed RPM relative to the rotational speed RPM at which the rear ground traction members 24 are being driven. In some implementations, the controller 60 automatically outputs the control signals to cause the front ground traction members 26 to be driven at the chosen lead. In some implementations, the controller 60 outputs a recommendation for the chosen lead to an operator and awaits the operator interface or authorization before outputting the control signals to operate the vehicle with the chosen lead.

In some implementations, the rear speed (recited block 112) for which a particular lead for the front ground traction members is chosen is based upon a ground speed input from an operator. In such an implementation, controller 60 may carry out method 200 set forth in FIG. 5. As indicated by block 206, controller 60 receives a ground speed input from an operator interface. The operator, using a ground speed input, such as a pedal, lever, touchscreen, switch, slide bar, mouse and screen or other input device may enter a chosen ground speed, the speed at which the vehicle itself is to travel or traverse a terrain.

As indicated by block 208, based upon this entered or input ground speed, the controller 60 may determine the rear speed for the rear ground traction members 24.

As indicated by block 212, the controller may then select a chosen lead for the rear speed determined in block 208 based upon an evaluation of different tractive efficiencies for different leads for the rear speed. As discussed above with respect to block 112, controller 60 may consult that portion of database 150 or the table 154 pertaining to the rear speed identified in block 208. Consulting that portion of database 150 are table 154, controller 60 may identify the particular lead L having the associated greatest tractive efficiency TE for the rear speed identified in block 208.

As indicated by block 216, instructions in memory 62 direct processor 64 to output control signals to the continuously variable speed front drive system 32 to drive the front ground traction members 26 at the chosen lead, at the selected rotational speed relative to the rotational speed RPM at which the rear ground traction members 24 are being driven. In some implementations, the controller 60 automatically outputs the control signals to cause the front ground traction members 26 to be driven at the chosen lead. In some implementations, the controller 60 outputs a recommendation for the chosen lead to an operator and awaits the operator interface or authorization before outputting the control signals to operate the vehicle with the chosen lead.

Figure 6:
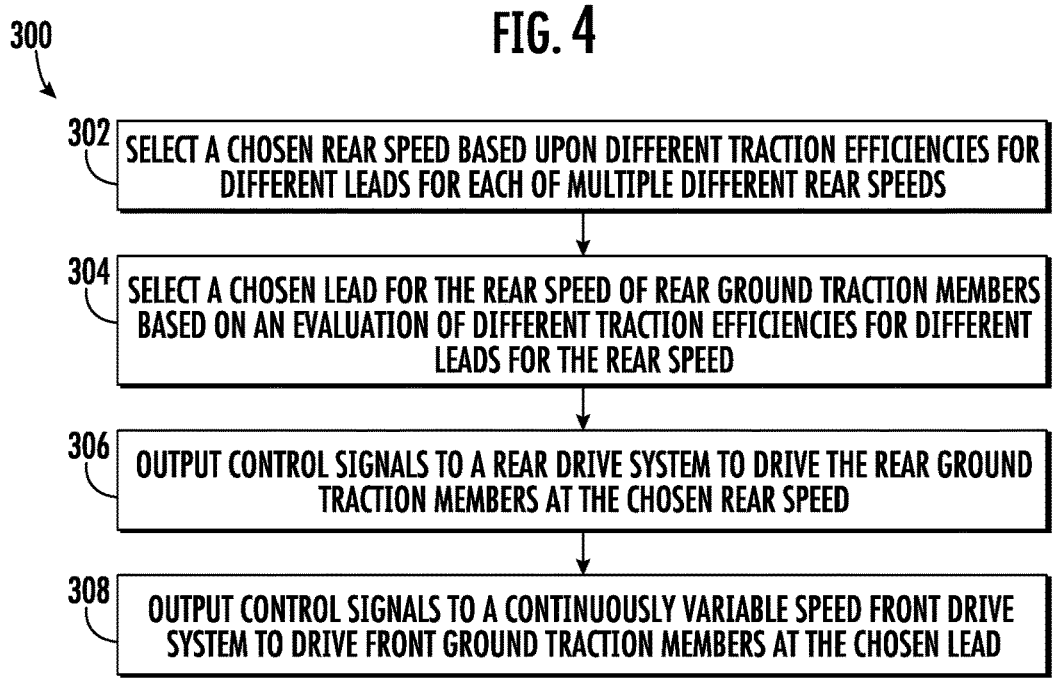
FIG. 6 is a flow diagram of an example method that may be carried out by the vehicle of FIG. 1.

In some implementations or when vehicle 10 is operating under a selected mode, the chosen lead and the rear speed are both selected by the controller 60 based upon evaluations of different tractive efficiencies for different leads. FIG. 6 is a flow diagram of an example method 300 that may be carried out by controller 60 pursuant to an operator selected mode. When carrying out method 300, controller 60 may choose a lead having the greatest tractive efficiency across multiple available rear speeds.

As indicated by block 302 in FIG. 6, controller 60 may select a rear speed based upon different tractive efficiencies for different leads for each of multiple different rear speeds. As indicated by block 304, controller 60 may further select a chosen lead for the rear speed of rear ground traction members based upon an evaluation of different tractive efficiencies for different leads for the rear speed. Pursuant to blocks 302 and 304, controller 60 may compare the different tractive efficiencies in all of the tables 151 to identify which optimal tractive efficiency lead (and which associated rear speed) has the greatest tractive efficiency. The chosen lead will be the lead corresponding to the greatest tractive efficiency. The selected or chosen rear speed will be the rear speed corresponding to the greatest tractive efficiency. For example, if tractive efficiency TE2 in table 151-2 is identified as having the greatest tractive efficiency amongst all of the tractive efficiencies in all of tables 151, the chosen lead will be the value of L2 in table 151-2 and the chosen rear speed will be RS2.

As indicated by block 306, once the chosen rear speed and the chosen lead have been selected, controller 60 may output control signals to the rear drive system 28 to drive the rear ground traction members 24 at the chosen rear speed. As indicated by block 308, controller 60 may output control signals to the continuously variable speed front drive system 32 to drive the front ground traction members 26 at the chosen lead. As discussed above, in some implementations, the switching of vehicle 10 to the chosen rear speed for traction members 24 and the chosen lead for traction members 26 may be automatic. In some implementations, controller 60 may alternatively output a recommended rear speed to the operator, wherein controller 60 outputs such control signals upon receiving further input or commands from the operator authorizing the switch of vehicle 10 to the chosen rear speed and the chosen lead.

In some implementations, controller 60 may select the chosen lead based upon additional factors that may impact tractive efficiency. In some circumstances, the type of underlying terrain, such as the type of soil, or the condition of the underlying terrain, such as moisture content of the soil, may impact the tractive efficiencies associated with different vehicle leads at different rear speeds. In some implementations, controller 60 may select the chosen lead additionally based upon the current type or conditions of the terrain underlying the vehicle 10.

Figure 7:
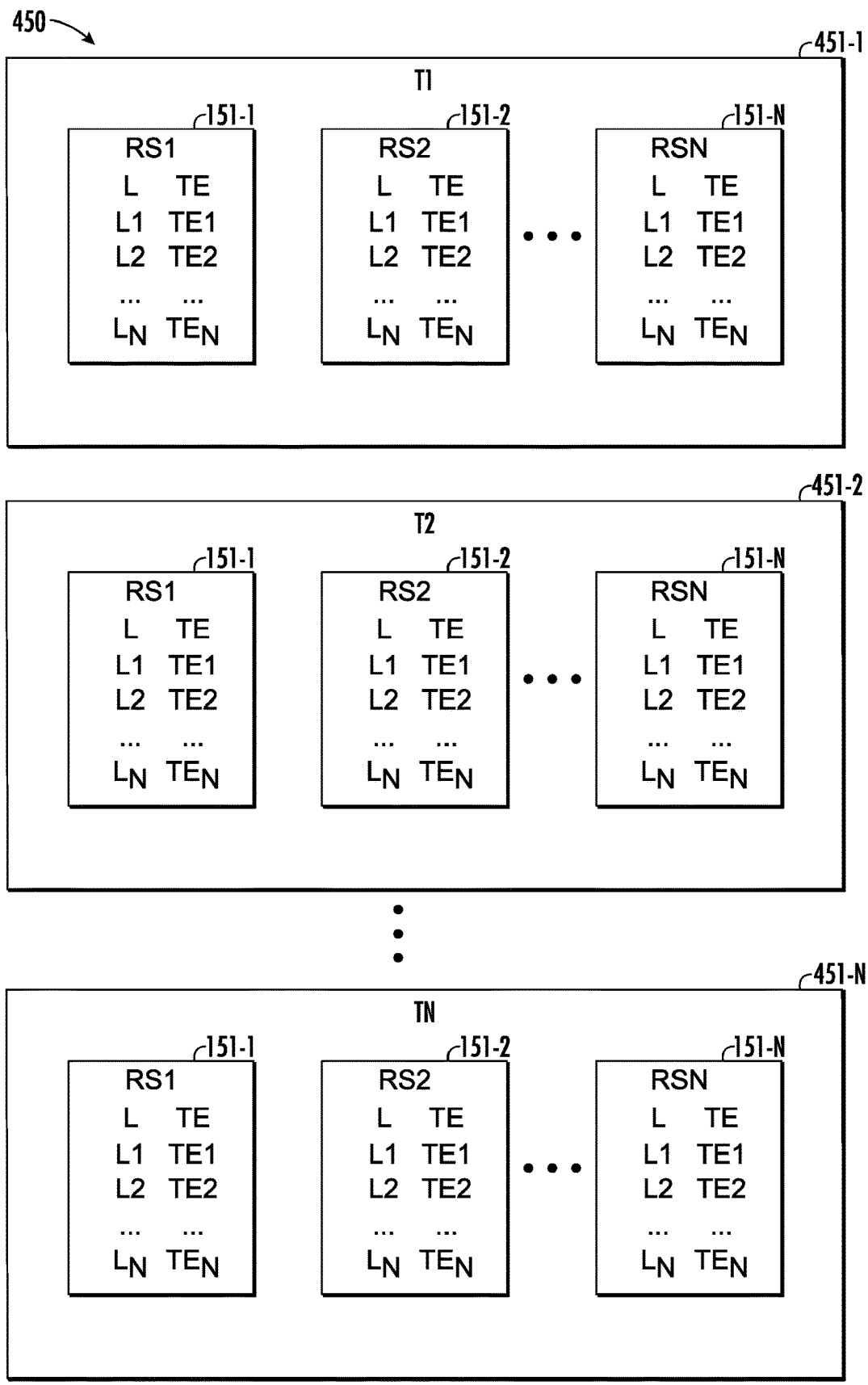
FIG. 7 is a diagram schematically illustrating an example database of leads and corresponding tractive efficiencies for different rear speeds on different terrains.

FIG. 7 illustrates an example database 450 that may be consulted by controller 60 when selecting a chosen lead for vehicle 10 at either a rear speed based upon an operator interface (such as described above with respect to method 200) or a chosen rear speed (such as described above with respect to method 300). Database 450 comprises an individual dataset (similar to database 150) for each of multiple different terrain conditions and/or types. In the example illustrated, database 450 comprises data sets 451-1, 451-2 . . . 451-N (collectively referred to as data sets 451) for the different terrain types/conditions T1, T2 . . . TN, respectively. Each of data sets 451 is similar to database 150 described above except that its values have been determined when vehicle 10 or a vehicle similar to vehicle 10 has been traveling across an underlying terrain having the particular terrain type or condition.

In such an implementation, controller 60 may receive signals from a terrain sensor, such as a camera. Controller 60 may identify or determine the type or condition of the soil based upon signals from the terrain sensor. Controller 60 may use the determined type or condition of terrain to determine which of the data sets 451 should be consulted for further selecting a chosen lead for vehicle 10.

Alternatively, controller 60 may determine the geographical location of the vehicle 10 (based upon signals from a location sensor, such as a global positioning system (GPS) sensor) and may use the determined geographical location to consult a terrain map which provides or indicates the current conditions or type of the terrain for the geographical location at which the vehicle currently resides. In some implementations, the operator may provide controller 60 with the type or condition of the soil or terrain to facilitate the determination of which of data sets 451 should be consulted for selecting the chosen lead. In some implementations, the operator may directly indicate to controller 60 (via an operator interface) which of the data sets 451 should be used for selecting the chosen lead.

Figure 8:
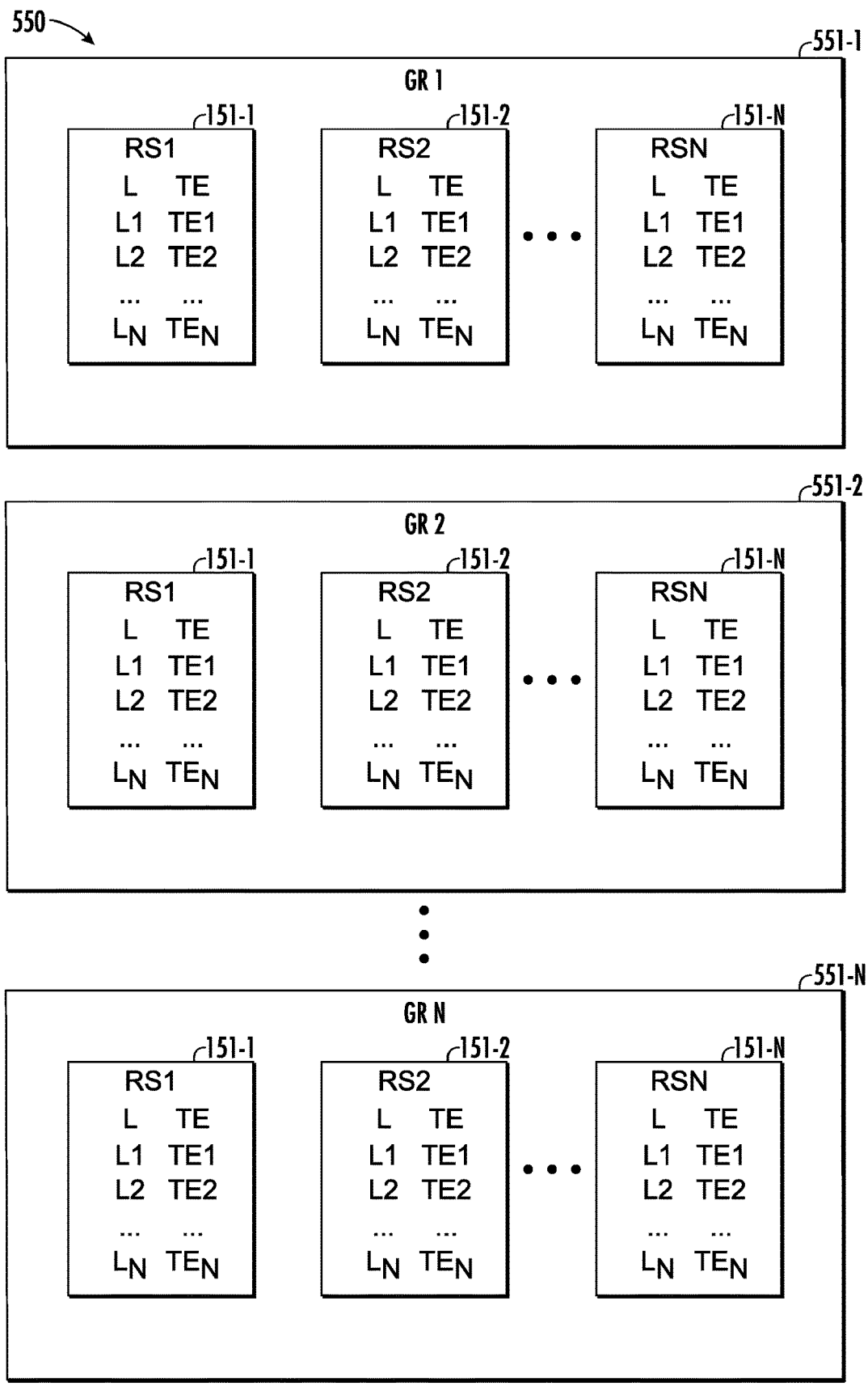
FIG. 8 is a diagram schematically illustrating an example database of leads and corresponding tractive efficiencies for different rear speeds in different geographic regions.

In some implementations, controller 60 may consult a database such as database 550 illustrated in FIG. 8 when selecting a chosen lead. Database 550 is similar to database 450 except that database 550 comprises an individual data set (similar to database 150) for each of multiple different geographical locations GR. In the example illustrated, database 550 comprises data sets 551-1, 551-2 . . . 551-N (collectively referred to as data sets 551) for the different geographical regions GR1, GR2 . . . GRN, respectively. Each of data sets 551 is similar to database 150 described above except that its values have been determined when vehicle 10 or vehicle similar to vehicle 10 has been traveling within a particular geographic region.

In some implementations, the values of database 550 may be determined based upon different terrain type/conditions (soil type/conditions) in different regions. For example, the terrain types or conditions may be obtained from prior maps or surveys. Based upon the determined terrain types or conditions, the expected tractive efficiencies for the different geographical regions having the different terrain types or conditions may be estimated.

In such implementations, controller 60 may determine the geographical location of the vehicle 10 (based upon signals from a location sensor, such as a global positioning system (GPS) sensor) and may use the determined geographical location to determine which of the data sets 551 should be consulted for selecting a chosen lead. In some implementations, the operator may provide controller 60 with the particular geographic region in which vehicle 10 is traveling or operating to facilitate the determination of which of data sets 551 should be consulted for selecting the chosen lead. In some implementations, the operator may directly indicate to controller 60 (via an operator interface) which of the data sets 551 should be used for selecting the chosen lead.

In each of the above databases or tables, the tractive efficiencies are based upon a default or nominal draft value, the pulling force provided by the vehicle 10 when at a particular ground speed correspond to the rear speed. The default or nominal draft value may be based upon a particular implement expected to be pulled or towed by vehicle 10. In some implementations, the tractive efficiency may be based upon an average draft value expected to be provided by or experienced by vehicle 10. In some implementations, vehicle 10 may be configured to pull or tow different types of implements resulting in different drafts. In such implementations, controller 60 may select the chosen lead additionally based upon the current draft of the vehicle 10.

Figure 9:
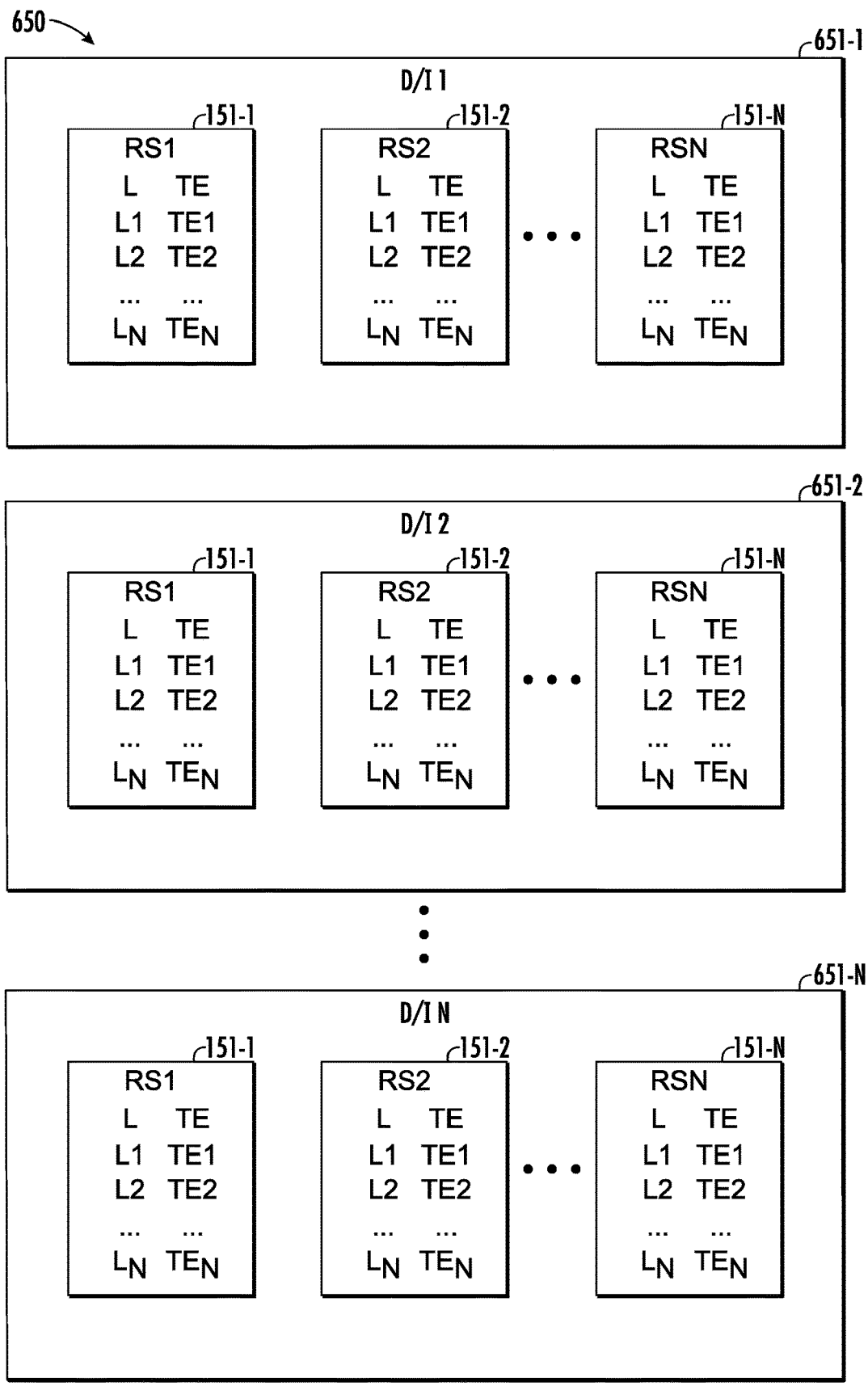
FIG. 9 is a diagram schematically illustrating an example database of leads and corresponding tractive efficiencies for different rear speeds with different drafts or implement types and/or states.

FIG. 9 illustrates an example database 650 that may be consulted by controller 60 when selecting a chosen lead for vehicle 10 at either a rear speed based upon an operator interface (such as described above with respect to method 200) or a chosen rear speed (such as described above with respect to method 300). Database 650 comprise an individual data set (similar to database 150) for each of multiple different draft values or multiple different implement types. In the example illustrated, database 650 comprises data sets 651-1, 651-2 . . . 651-N (collectively referred to as data sets 651) for the different drafts or implement types D/I 1, D/I2 . . . D/I-N, respectively. Each of data sets 651 is similar to database 150 described above except that its values have been determined when vehicle 10 or vehicle similar to vehicle 10 has pulled or towed particular type of implement or provided a particular draft (pulling force) or range of draft values.

In such implementations, controller 60 may determine the current draft of the vehicle 10 (based upon signals from a draft sensor, such as a hitch pin connecting the implement drawbar to the vehicle and having a strain sensor or based upon signals from various strain sensors attached to the links of the three-point hitch). In some implementations, the vehicle may be equipped with an implement sensor to detect or sense the implement and its current operational state. For example, the vehicle may be equipped with a camera and a neural network that utilizes optical recognition to identify the particular implement. Once a particular implement has been identified, the draft associated with the implement and its operation may be determined to determine which of the data sets 651 should be consulted or, where the data sets 651 are based upon implement type, the type of implement may be used to directly determine which data set 651 should be consulted for selecting the chosen lead. In some implementations, the operator may provide controller 60 with the implement type or draft value to facilitate the determination of which of data sets 551 should be consulted for selecting the chosen lead. In some implementations, the operator may directly indicate to controller 60 (via an operator interface) which of the data sets 651 should be used for selecting the chosen lead.

Figure 10:
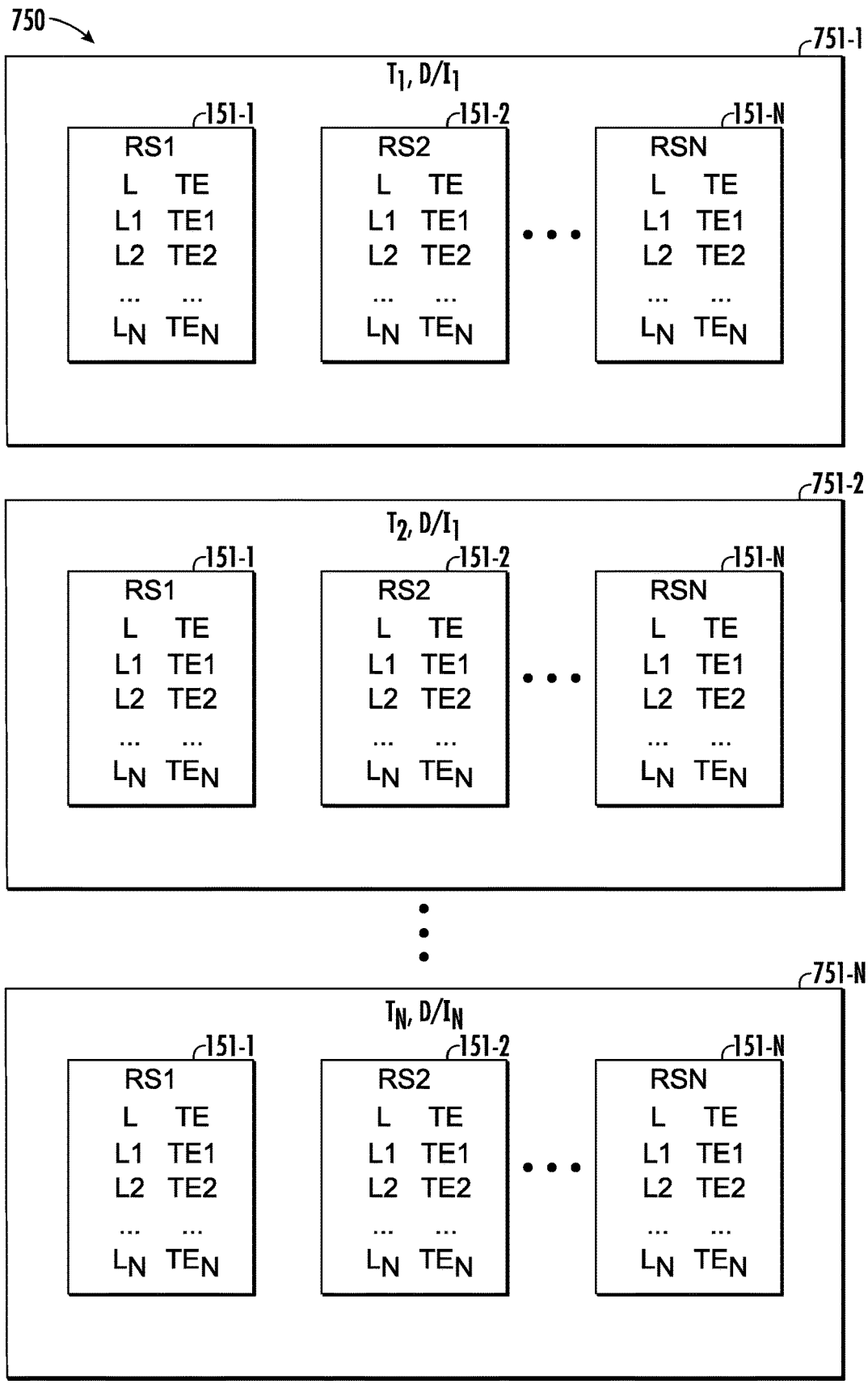
FIG. 10 is a diagram schematically illustrating an example database of leads and corresponding tractive efficiencies for different rear speeds with different terrains and different drafts or implement types and/or states.

In some implementations, controller 60 may select the chosen lead based upon a combination of additional factors that may impact tractive efficiency. FIG. 10 illustrates an example database 750 that may be consulted by controller 60 when selecting a chosen lead for vehicle 10 at either a rear speed based upon an operator interface (such as described above with respect to method 200) or a chosen rear speed (such as described above with respect to method 300). Database 750 comprise an individual data set (similar to database 150) for each of multiple different terrain conditions and/or types and draft/implement factors. In the example illustrated, database 750 comprises data sets 751-1, 751-2 . . . 751-N (collectively referred to as data sets 751) for different terrain types/conditions T with different drafts or implement types D/I. Database 850 comprises data sets 751-1, 751-2 . . . 751-N for $T_1$ $D/I_1$, $T_2$, $D/I_1$ . . . $T_N$, $E/I_N$, respectively. Each of the data sets 751 is similar to database 150 described above except that its values have been determined on the basis of vehicle 10 or a vehicle similar to vehicle 10 having a particular draft (range of drafts) and a particular terrain condition or type. Such values may be empirically determined from prior testing or determined by estimating such values from previously determined relationships and assumptions.

In such an implementation, controller 60 may receive signals from a terrain sensor, such as a camera or a sensor that directly contacts the ground. Controller 60 may identify or determine the type or condition of the soil based upon signals from the terrain sensor. In some implementations, controller 60 may use the current geographic location of the vehicle and a terrain map to determine the current terrain condition and/or type.

Controller 60 may further determine the current draft of the vehicle 10 (based upon signals from a draft sensor, such as a hitch pin connecting the implement drawbar to the vehicle and having a strain sensor or based upon signals from various strain sensors attached to the links of the three-point hitch). In some implementations, the vehicle may be equipped with an implement sensor to detect or sense the implement and its current operational state. For example, the vehicle may be equipped with a camera and a neural network that utilizes optical recognition to identify the particular implement. Once a particular implement has been identified, the draft associated with the implement and its operation may be determined. In some implementations, the operator may provide controller 60 with the implement type or draft value.

Once the current terrain and the current draft or implement identification/operation has been obtained by controller 60, controller 60 may use such information to determine which of the data sets 751 should be consulted for selecting the chosen lead. In some implementations, the operator may directly indicate to controller 60 (via an operator interface) which of the data sets 751 should be used for selecting the chosen lead.

Figure 11:
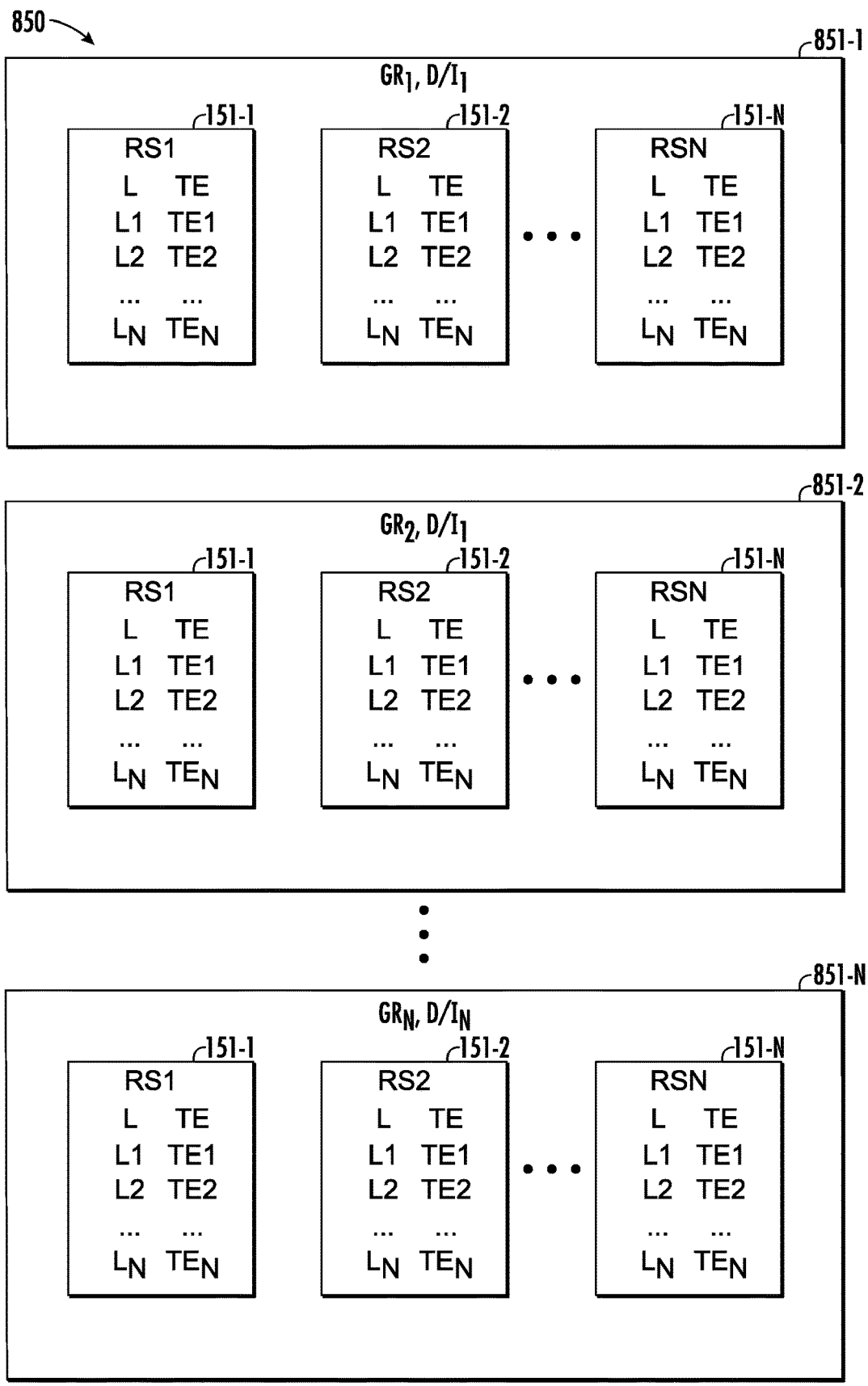
FIG. 11 is a diagram schematically illustrating an example database of leads and corresponding tractive efficiencies for different rear speeds in different geographic regions and with different drafts or implement types and/or states.

FIG. 11 illustrates an example database 850 that may be consulted by controller 60 when selecting a chosen lead for vehicle 10 at either a rear speed based upon an operator interface (such as described above with respect to method 200) or a chosen rear speed (such as described above with respect to method 300). Database 850 comprise an individual data set (similar to database 150) for each of multiple different geographic regions and/or types and draft/implement factors. In the example illustrated, database 850 comprises data sets 851-1, 851-2 . . . 851-N (collectively referred to as data sets 851) for the different drafts or implement types in different geographic regions $GR_1$ $D/I_1$, $/GR_2$, $D/I_1$ . . . $GR_N$, $E/I_N$, respectively. Each of the data sets 851 is similar to database 150 described above except that its values have been determined on the basis of vehicle 10 or a vehicle similar to vehicle 10 having a particular draft (range of drafts) in a particular geographic region. Such values may be empirically determined from prior testing or determined by estimating such values from previously determined relationships and assumptions.

In such an implementation, controller 60 may receive signals from a location sensor, such as a GPS antenna having an associated GPS receiver. Controller 60 may further determine the current draft of the vehicle 10 (based upon signals from a draft sensor, such as a hitch pin connecting the implement drawbar to the vehicle and having a strain sensor or based upon signals from various strain sensors attached to the links of the three-point hitch). In some implementations, the vehicle may be equipped with an implement sensor to detect or sense the implement and its current operational state. For example, the vehicle may be equipped with a camera and a neural network that utilizes optical recognition to identify the particular implement. Once a particular implement has been identified, the draft associated with the implement and its operation may be determined. In some implementations, the operator may provide controller 60 with the implement type or draft value.

Once the current geographic location of the vehicle 10 and the current draft or implement identification/operation has been obtained by controller 60, controller 60 may use such information to determine which of the data sets 851 should be consulted for selecting the chosen lead. In some implementations, the operator may directly indicate to controller 60 (via an operator interface) which of the data sets 851 should be used for selecting the chosen lead.

As described above with respect to FIGS. 3 and 4, each of the data sets 451, 551, 651, 751 and 851 may alternatively be condensed into a table, such as table 154 in FIG. 4. The condensed table identifies the particular lead L having the maximum or greatest tractive efficiency for the particular rear speed RS. Those data sets that are at least partially based upon geographic regions may be further condensed into lead maps. For example, with respect to database 550, each of the data sets 551 may be condensed into an optimum tractive efficiency table similar to table 154. The optimum tractive efficiency tables correspond to data sets 551-1, 551-2 . . . 551-N may be condensed into a lead maps for different rear speeds.

Figure 12:
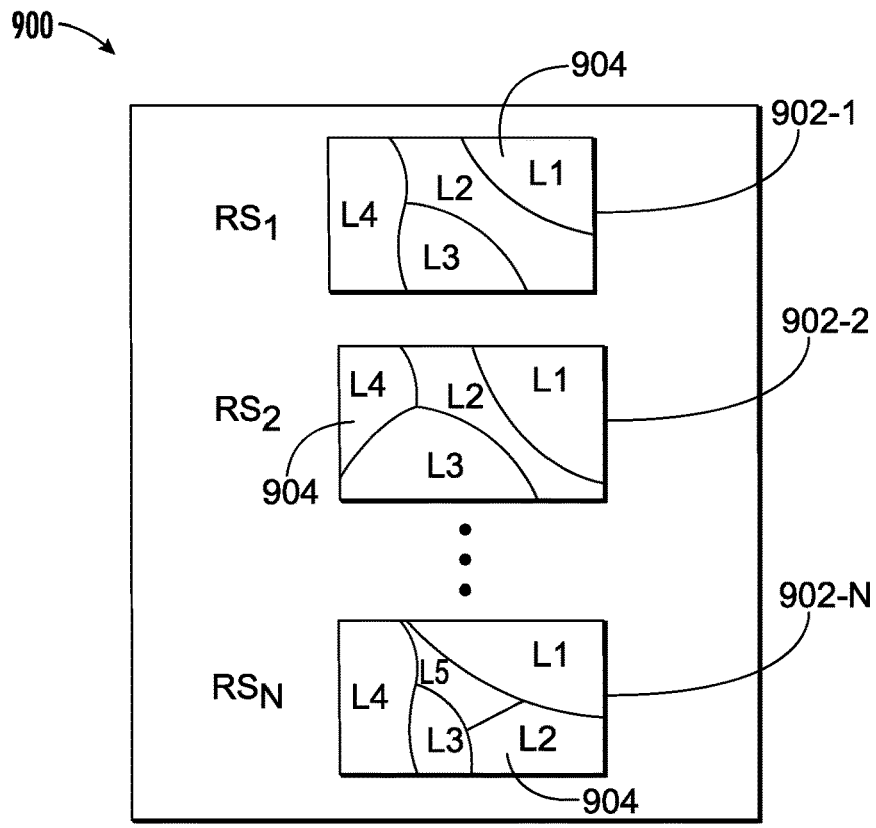
FIG. 12 is a diagram schematically illustrating an example set of lead maps for different rear speeds, each of the maps mapping different optimum leads for different regions.

FIG. 12 illustrates an example map set 900 based upon database 550. Map set 900 comprises a set of individual lead maps 902-1, 902-2 . . . 902-N (collectively referred to as lead maps 902) for rear speeds $RS_1$, $RS_2$ . . . $RS_N$, respectively. Each of the example lead maps 902 comprises geographic regions 904. Each of the geographic regions 904 has an associated optimal lead of value L indicating the lead at which the vehicle 10 traveling in the particular geographic region 904 and having the particular rear speed RS will achieve the greatest tractive efficiency TE. As shown by FIG. 12, the regions 904 of different maps 902 may have different sizes, shapes and numbers depending upon where tractive efficiencies change such that the recommended lead values also change. As should be appreciated, the size, shape and number of different regions 904 may vary in multiple fashions.

When vehicle 10 is operating in a map-based mode, controller 60 may receive signals from rear speed sensor 50 indicating the rear speed of rear traction members 24. Based upon such signals, controller 60 may select which of the particular maps 902 to consult. Upon determining the current location of vehicle 10, such as from a GPS antenna or by other methods, controller 60 may determine in which of the regions 904 in the particular map 902 that vehicle 10 currently resides. Upon determining which region of the particular map vehicle 10 resides, controller 60 may determine the recommended lead of value L from of the map. At such time, controller 60 may either output the recommended lead to an operator of vehicle 10 and/or may automatically output control signals causing front drive system 32 to drive front wheel 26 at the recommended lead L.

Figure 13:
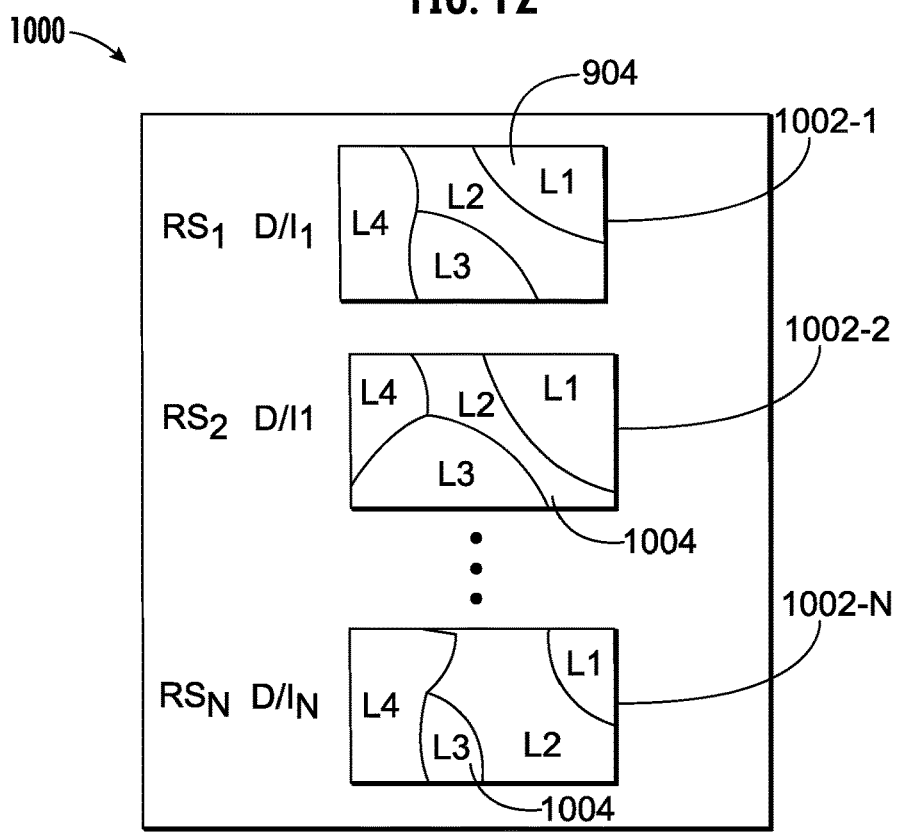
FIG. 13 is a diagram schematically illustrating an example set of lead maps for different rear speeds and different drafts or implement types and/or states, each of the maps mapping different optimum leads for different regions.

FIG. 13 illustrates an example map set 1000 based upon database 850. Map set 1000 comprises a set of individual lead maps 1002-1, 1002-2 . . . 1002-N (collectively referred to as lead maps 1002) for rear speeds $RS_1$, $RS_2$ . . . $RS_N$, and draft/implements $D/I_1$, $D/I_2$, . . . $D/I_N$, respectively. Each of the example lead maps 1002 comprises geographic regions 1004. Each of the geographic regions 1004 has an associated optimal lead of value L indicating the lead at which the vehicle 10 traveling in the particular geographic region 1004 with the particular rear speed RS and with the particular draft D or implement I (operation and/or type) will achieve the greatest tractive efficiency TE. As shown by FIG. 13, the regions 1004 of different maps 1002 may have different sizes, shapes and numbers depending upon where tractive efficiencies change such that the recommended lead values also change. As should be appreciated, the size, shape and number of different regions 1004 may vary in multiple fashions.

When vehicle 10 is operating in a map-based mode, controller 60 may receive signals from rear speed sensor 50 indicating the rear speed of rear traction members 24. Controller 60 may further receive signals from a draft sensor or from an implement sensor indicating the current draft force (pulling force) or implement being pulled by the vehicle. Based upon such signals, controller 60 may select which of the particular maps 1002 to consult. Upon determining the current location of vehicle 10, such as from a GPS antenna or by other methods, controller 60 may determine in which of the regions 1004 in the particular map 1002 that vehicle 10 currently resides. Upon determining which region of the particular map vehicle 10 resides in, controller 60 may determine the recommended lead value L from the map. At such time, controller 60 may either output the recommended lead to an operator of vehicle 10 and/or may automatically output control signals causing front drive system 32 to drive front wheel 26 at the recommended lead L.

Figure 14:
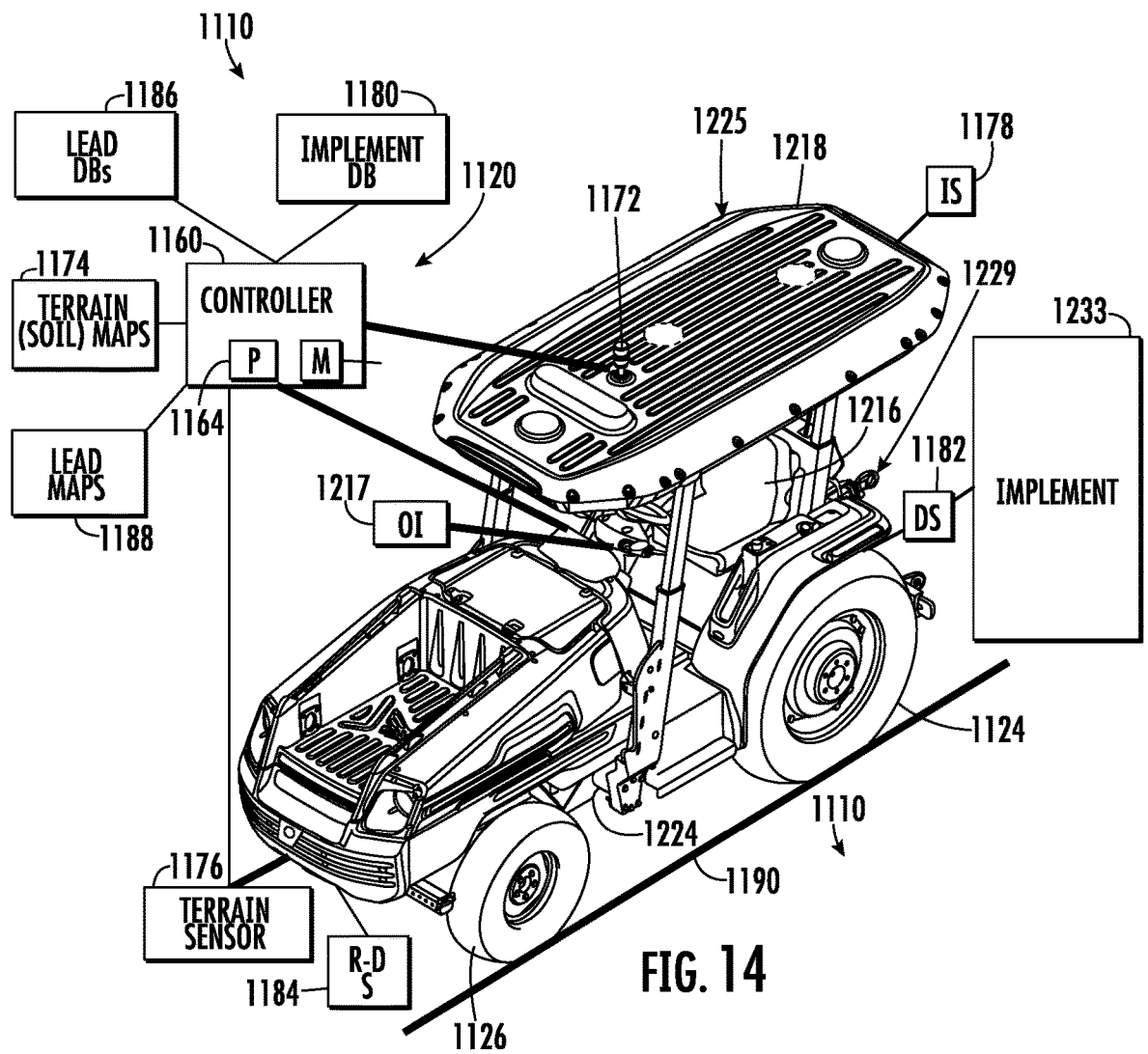
FIG. 14 is a top illustrating an example vehicle comprising an example lead control system, with portions being schematically illustrated.

FIGS. 14-17 illustrate portions of an example vehicle 1110 which includes an example lead control system 1120. FIGS. 14-17 illustrate an example of how the vehicle described above with respect to FIG. 1 may be embodied as a tractor and may be provided with various operator selectable modes and additional optional features for not only controlling the lead of the vehicle but also acquiring tractive efficiency data for use by other vehicles in controlling their leads. Vehicle 1110 is in the form of an agricultural tractor and comprises frame 1224, operator cab 1225, propulsion system 1228, rear wheels 1124 (which serve as rear ground traction members) and steered front wheels 1126 (which serve as front ground traction members), clevis hitch 1227 (shown in FIG. 15), hitch pin 1229 (shown in FIG. 15) and three-point hitch 1229 (a portion of which is shown in FIG. 14).

Frame 1224 comprises a structure which supports the remaining components of vehicle 1110. Frame 1224 supports operator cab 1225. Operator cab 1225 comprises that portion of vehicle 1110 in which an operator of vehicle 1110 resides during use of vehicle 1110. In the example illustrated, operator cab 1225 comprises seat 1216, operator interface 1217, and roof 1218. Seat 1216 is beneath roof 1218.

Operator interface 1217 is positioned proximate to seat 1216 and includes various controls by which an operator may exert control over a vehicle 1110 and receive information regarding the operation of vehicle 1110 and any attached implements. Operator interface 1217 (schematically illustrated) may comprise multiple input devices in the form of foot pedal, a lever, a touchscreen, a monitor and mouse, keyboard, a touch pad, a joystick, a stylus pen, a toggle switch, slide bar, a microphone with speech recognition or the like. For example, a foot pedal or lever may be utilized buying operator to select a ground speed for vehicle 1110. Information may be provided to the operator on a display screen, series of LED lights or the like. In implementations where vehicle 1110 is configured to be remotely controlled, operator interface 1217 may be remote from the remainder of vehicle 1110, wherein signals from operator interface 1217 communicate with vehicle 1110 in a wireless fashion.

Figure 16:
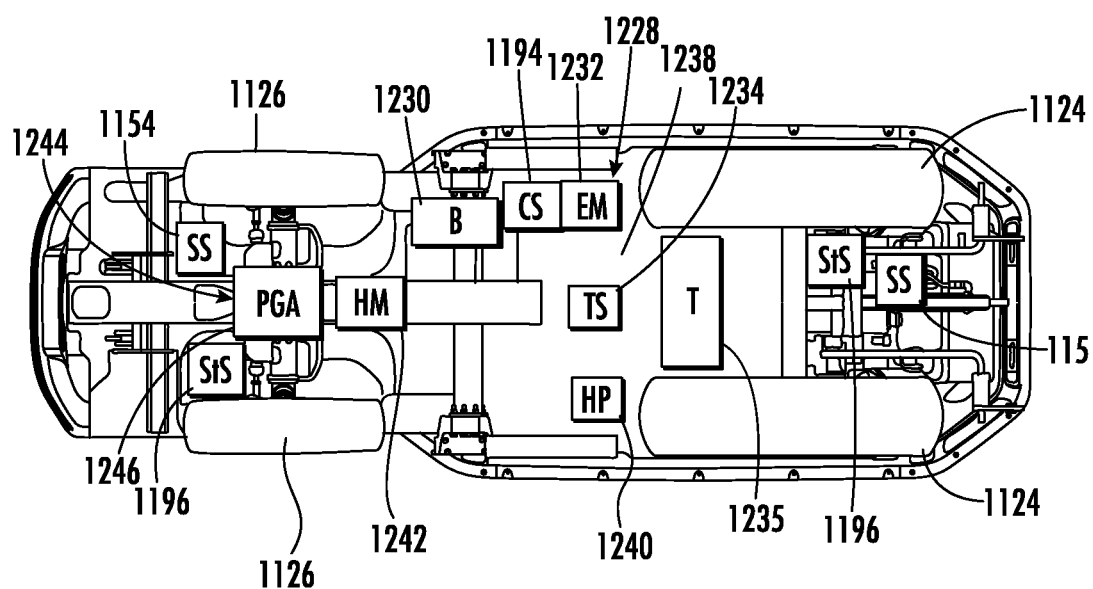
FIG. 16 is a bottom view of the example vehicle of FIG. 14, with portions being schematically illustrated.

Propulsion system 1228 serves to propel vehicle 1110 in forward and reverse directions. As shown by FIG. 16, propulsion system 1228 comprises battery 1230, electric motor 1232, torque splitter 1234, transmission 1235, transaxle 1238, hydraulic pump 1240, hydraulic motor 1242 and front wheel transmission 1244. Battery 1230 comprises one or more battery modules which store electrical energy. Battery 1230 is supported within an internal battery receiving cavity provided by frame 1224. Battery 1230 powers the electric motor 1232.

Electrical motor 1232 (schematically illustrated) outputs torque which is transmitted by a gearing to torque splitter 1234. Torque splitter 1234 transmits torque to transmission 1235 and to hydraulic pump 1240. Transmission 1235 provides a plurality of forward and reverse gears providing different rotational speeds and torques to the rear wheels 1124.

Transaxle 1236 extends from transmission 1235 and transmits torque to front wheel transmission 1244 for rotatably driving the front steered wheels 1126. Hydraulic pump 1240 is driven by the torque provided by electric motor 1232. Hydraulic pump 1240 supplies pressurized hydraulic fluid to drive hydraulic motor 1242. Hydraulic motor 1242 supplies torque to front wheel transmission 1244. This additional torque facilitates the rotatable driving of front wheels 1126 at speeds that proportionally differ than the rotation speeds at which rear wheels 1124 are being driven by transmission 1235.

Figure 17:
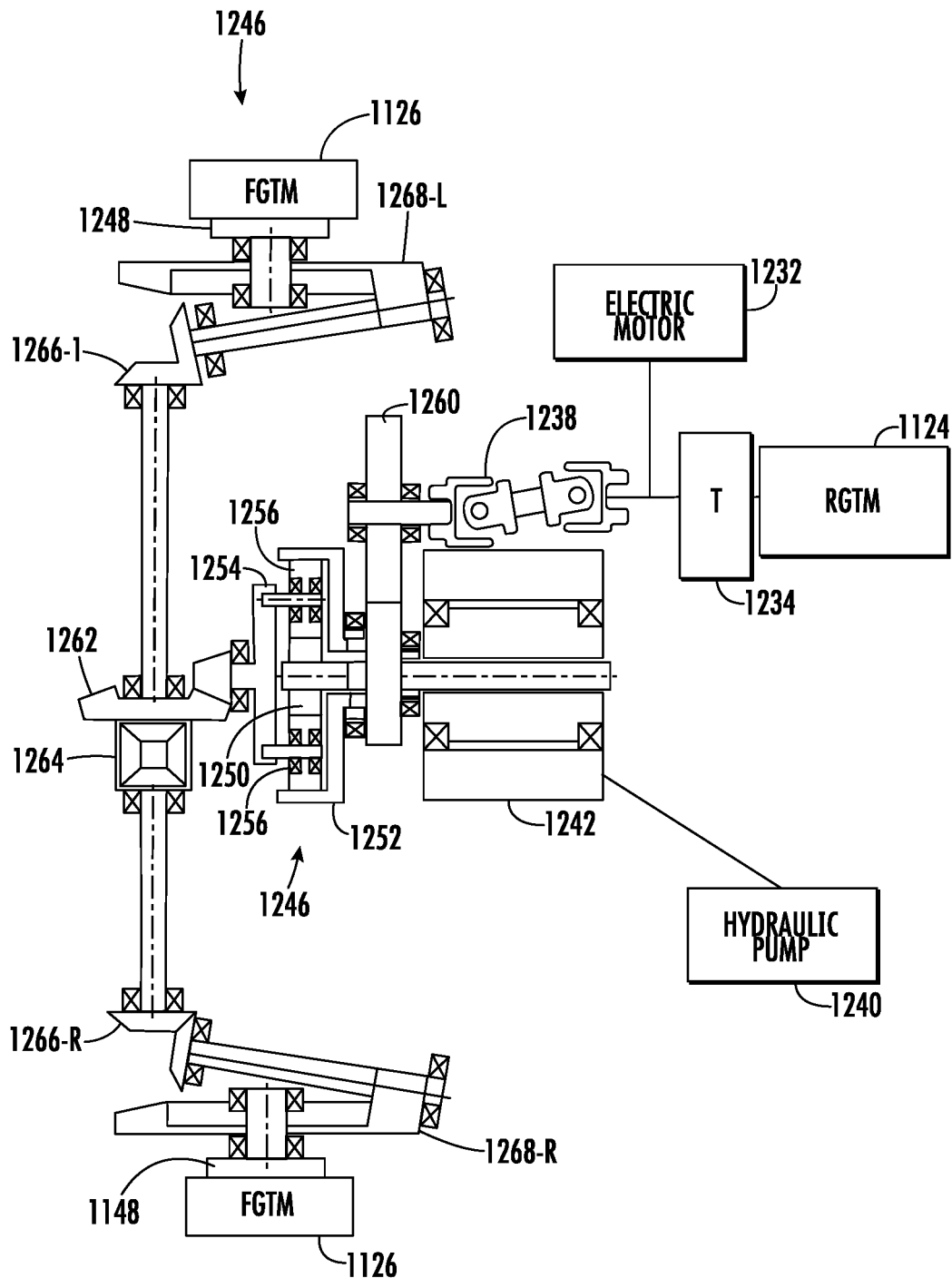
FIG. 17 is a fragmentary sectional view illustrating portions of an example propulsion system of the example vehicle of FIG. 14.

Front wheel transmission 1244 delivers torque from one or both of transaxle 1236 and hydraulic motor 1242 to front wheels 1126. FIG. 17 illustrates portions of one example propulsion system 1228 including hydraulic pump 1240, hydraulic motor 1242 and planetary gear assembly 1246. Hydraulic pump 1240 powers hydraulic motor 1242. In the example illustrated, hydraulic pump 1240 comprises a continuous input variable displacement hydraulic piston pump. Hydraulic motor 1242 comprises a modulation hydraulic motor.

Planetary gear assembly 1246 combines torque from transaxle 1238 and from hydraulic motor 1242 and outputs the combined torque to front wheels 1126 (shown In FIGS. 14 and 16) which are connected to front wheel flanges 1248. Planetary gear assembly 1246 comprises a sun gear 1250, ring gear 1252 and planet carrier 1254 supporting planet gears 1256 which intermesh with sun gear 1250 and ring gear 1252.

Sun gear 1250 serves as a first input for planetary gear assembly 1246. Sun gear 1250 is connected to and receives torque from output shaft of hydraulic motor 1242. Ring gear 1252 serves as a second input for planetary gear assembly 1246. Ring gear 1252 is connected to transaxle 1238 by a gear set 1260. In other implementations, ring gear 1252 may be connected to transaxle 1238 by other transmission mechanisms such as belt and pulley arrangement or a chain sprocket arrangement. Planet carrier 1254 is connected to gear set 1262 and serves as an output for planetary gear assembly 1246.

Gear set 1262 comprises a pair of bevel gears connected to differential 1264. Differential 1264 outputs torque to gear sets 1266-L and 1266-R which further transmit torque to gear sets 1268-L and 1268-R which are connected to left and right wheel flanges 1248.

FIGS. 16 and 17 illustrate one example of propulsion system 1228. In other implementations, propulsion system 1228 may have other forms or configurations. For example, in other implementations, propulsion system 1228 may comprise other combinations of electric motors, hydraulic pumps and hydraulic in some implementations, vehicle propulsion system 1228 may omit hydraulic systems. In some implementations, propulsion system 1228 may omit electric motors, such as where vehicle propulsion system 1228 relies upon an internal combustion engine for supplying torque directly to the transmissions or using hydraulic pumps and motors.

Rear wheels 1124 extend at a rear portion of frame 1224 of vehicle 1110 and are not steerable while front wheels 1126 extend at a front portion of the frame 1224 and are steerable. Front wheels 1126 are rotatably supported by frame 1224 and are configured to be rotatably driven at different speeds or revolutions for minute relative to the speeds at which rear wheels 1124 are driven.

Battery 1230, electric motor 1232, and transmission 1235 serve as a rear drive system for driving rear wheels 1124. Battery 1230, electric motor 1232, hydraulic pump 1240, hydraulic motor 1242 and forward transmission 1244, including planetary gear assembly 1246, serve as a continuous variable speed front drive system. Hydraulic motor 1242 is configured to be modulated so as to vary the rotational speed at which front wheels 1126 are driven relative to the speed at which rear wheels 1124 are driven. Through the modulation of hydraulic motor 1242, the lead of front wheels 1126 may be adjusted and controlled.

Clevis hitch 1227 projects from the rear of vehicle 1110 and is configured to receive an implement drawbar 1231. Clevis hitch 1227 includes a pair of aligned apertures, which when aligned with an aperture of drawbar 1231, receive hitch pin 1229 to connect an implement 1233 (schematically illustrated) to vehicle 1110 that is to be pulled or towed.

Three-point hitch 1229 projects from the rear of vehicle 1110 includes an upper link and a pair of lower links for being connected to an implement, such as implement 1233, that is to be pulled or towed.

Lead control system 1120 is similar to lead control system 20 described above in that lead control system 1120 selects a chosen lead for the front wheels 1126 relative to the rear speed of rear wheels 1124 based upon an evaluation of different tractive efficiencies for different leads for the particular rear speed. Lead control system 1120 further outputs control signals to a continuously variable speed front drive system by outputting control signals to hydraulic motor 1242 to modulate hydraulic motor 1242 so as to drive the front ground traction members or wheels 1126 with the chosen lead. The control signals may be output automatically upon selecting the chosen lead or may be output after system 1120 has recommended the chosen lead to an operator and after the operator has confirmed or authorized the switch to the chosen lead.

Lead control system 1120 comprises rear speed sensor 1150, front speed sensor 1154, geographic location sensor 1172, terrain maps 1174, terrain sensor 1176, implement sensor 1178, implement database 1180, draft sensor 1182, radar-Doppler sensor 1184, lead databases 1186, lead maps 1188 and controller 1160. Rear speed sensor 1150 comprise a sensor configured to output signals indicating a current rotational speed at which rear ground traction members in the form of wheels 1124 are being driven. Such signals may directly indicate the sensed rotational velocity of rear ground traction members 24 or may indirectly indicate the sensed rotational velocity of the rear wheels 1124, wherein the rotational velocity may be derived from such signals by controller 1160. In one example implementation, rear speed sensor 1150 may comprise what is commercially available as a "wheel speed sensor" or "vehicle speed sensor". Such a wheel speed sensors may comprise a toothed ring and pickup sized to read the speed of vehicle wheel rotation. Such sensors may utilize optics, magnetics or other mechanisms.

Front speed sensor 1154 is similar to rear speed sensor 1150 except that front speed sensor 1154 comprises a sensor configured to output signals indicating a current rotational speed at which the front ground traction members, in the form of front wheels 1126, are being driven. Such signals may directly indicate the sensed rotational velocity of rear ground traction members 1126 or may be indirectly indicate the sensed rotational velocity of the rear ground traction members 1126, wherein the rotational velocity may be derived from such signals by controller 60. In one example implementation, front speed sensor 1154 may comprise what is commercially available as a "wheel speed sensor" or "vehicle speed sensor". Such a wheel speed sensors may comprise a toothed ring and pickup sized to read the speed of vehicle wheel rotation. Such sensors may utilize optics, magnetics or other mechanisms.

Geographic location sensor 1172 comprises one or more sensors configured to output signals to controller 1160 to facilitate the identification of the geographic location of vehicle 1110 by controller 1160. Signals from geographic location sensor 1172 may be further used to identify a ground speed of vehicle 1110. In the example illustrated, geographic location sensor 1172 comprises a global positioning system (GPS) antenna. The GPS antenna comprises an antenna situated upon roof 318 and provided as part of a larger global positioning satellite system, global navigation system (GNS) or other satellite-based radio navigation system. The antenna may be associated with a GPS receiver.

Terrain maps 1174 comprise maps indicating different terrain conditions and/or types for different geographical regions. Terrain maps may be stored locally on vehicle 1110 or may be remote, being accessed from a server by controller 1160 in a wireless fashion. Based upon signals from geographic location sensor 1172 and terrain maps 1174, controller 1160 may determine the type or conditions of the terrain 1190 currently underlying or about to underlie vehicle 1110.

Terrain sensor 1176 comprise a sensor configured to sense the soil or underlying terrain 1190. In some implementations, terrain sensor 1176 may comprise a camera carried by vehicle 1110, such as near an underside of vehicle 1110. Images captured by the so sensor 1176 may be utilized to determine the type and such or condition of the underlying terrain 1190. As described above, in some circumstances, the type and such or condition of the underlying terrain may have an impact upon tractive efficiencies.

Implement sensor 1178 comprise a sensor configured to sense any implement currently attached or being pulled by vehicle 1110. In some implementations, implement sensor 1170 may comprise a camera mounted proximate a rear of vehicle 1110 and having a field-of-view that includes an attached implement 1233. In such an implementation, a neural network, trained to identify implements, may be utilized to analyze images of implement 1233 to identify the particular implement 1233 and/or its characteristics. Implement database 1180 comprise a database identifying draft values associated with different implements. As discussed above, based upon an identification of the implement being pulled, controller 1160 may determine a draft force being provided by vehicle 1110.

Figure 15:
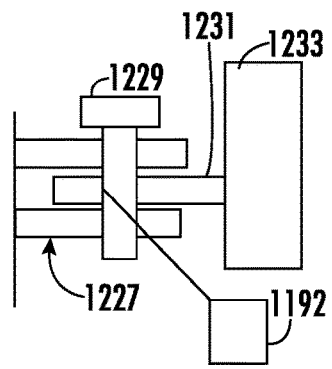
FIG. 15 is an enlarged fragmentary side view of an example clevis hitch, hitch pin and strain sensor of the vehicle of FIG. 14.

Draft sensor 1182 comprise a sensor to directly sense the draft of vehicle 1110. Draft sensor 1182 may be operative coupled between implement 1233 and vehicle 1110. For example, as shown in FIG. 15, in some implementations, the hitch pin 1229 may be provided with a strain sensor 1192 which serves as a draft sensor to sense a pulling force provided by vehicle 1110. In some implementations, the links of the three-point hitch 1229 may be provided with similar strain sensors for sensing the force of vehicle 1110 during pulling of implement 1233.

Radar-Doppler sensor 1184 comprise a sensor carried by vehicle 1110 and configured to output signals indicating a ground speed for vehicle 1110. In such an implementation, sensor 1184 fires a radar beam towards the ground or other structure and measures a Doppler shift of the returning beam for the calculation of a speed of the vehicle. As will be described hereafter, the detected ground speed may be used by controller 1160 to carry out tractive efficiency determinations and to populate lead databases 1186 and lead maps 1188 with tractive efficiency data.

Lead databases 1186 comprise databases that provide either different tractive efficiencies for different leads under certain conditions or those leads that have the largest tractive efficiency under selected conditions. Lead databases 1186 may comprise databases 450, 550, 650, 750 and 850 described above. Controller 1160 may consult such databases to select a chosen lead for the front wheels 1126 of vehicle 1110.

Lead maps 1188 identify recommended leads for different geographic locations based upon certain conditions such as the implement being towed, the sensed draft of the vehicle, and/or terrain conditions and/or types. Lead maps 1188 may comprise lead maps such as lead maps 900 and 1000 described above. Controller 1160 may consult lead maps, based upon the current sensor determining conditions to select a chosen lead.

Controller 1160 comprises memory 1162 and processor 1164. Memory 1162 comprises a non-transitory computer-readable medium containing instructions for directing processor 1164. Processor 1164 comprises a processing unit configured to follow such instruction contained in memory 1162. Instructions contained in memory 1162 may direct processor loan 64 to carry out method 100 and its various forms, wherein the controller selects a chosen lead and outputs control signals providing the vehicle with the chosen lead. Controller 1160 may operate in one of various operator selected modes based upon input received through operator input 1217.

In the example illustrated, lead control system 1120 is operable in a first mode in which method 200, described above, is performed, and a second mode in which method 300, described above, is performed. In the example illustrated, lead control system 1120 may be operable in an operator selected mode during which controller 1160 selects the chosen lead based upon the current or anticipated rear speed of rear wheels 1124 and database 150 or table 154 pursuant to method 200 or 300 as described above. In such a mode, the database 150 and the table 154 have tractive efficiencies that have been previously determined based upon a default terrain soil or condition (median or average values) and a default draft values (median, average or other selected values).

Lead control system 1120 may be operable in an operator selected mode during which controller 1116 determines the current or forthcoming terrain conditions and/or type based upon signals from terrain sensor 1176 and/or based upon the geographic location of vehicle 1110. The terrain type and/or condition may be determined from location of vehicle 1110 (determined based upon signals from identification sensor 1172) and the terrain maps 1174. Controller 1160 utilizes the identified terrain type and/or condition to determine which of data sets 451 in database 450, found in lead databases 1186, to use to select the chosen lead based upon the current or anticipated rear speed RS. In such a mode, database 450 may have tractive efficiencies that have been previously determined based upon default draft values (median, average values or other selected values).

Lead control system 1120 may be operable in an operator selected mode during which controller 1160 determines a geographic location of vehicle 1110 based upon signals from location identification sensor 1172. Controller 1160 utilizes the identified geographic location of vehicle 1110 to determine which of the data sets 551 of database 550, found in lead databases 1186, to use to select the chosen lead based upon the current or anticipated rear speed RS. In such a mode, database 550 may have tractive efficiencies that have been previously determined based upon default draft values (median, average values or other selected values).

Lead control system 1120 may be operable in an operator selected mode during which controller 1160 determines the current draft of vehicle 1110 or the current implement being pulled by vehicle 1110, wherein controller 1160 may determine a draft value based upon the implement being pulled. Controller 1160 may determine the current draft value based upon signals from draft sensor 1182, such as with a strain sensor 1192 associated with a hitch pin 1229 or strain sensors associated with links of a three-point hitch. In some implementations, controller 1160 may determine the implement and/or its state based upon signals from implement sensor 1178 and implement database 1180.

Controller 1160 utilizes the identified implement and/or state, or the determined draft to determine which of the data set 651 of database 650, found in lead databases 1186, to use to select the chosen lead based upon the current or anticipated rear speed RS. In such a mode, database 650 may have tractive efficiencies that have been previously determined based upon a default terrain soil or condition (median or average values).

Lead control system 1120 may be operable in an operator selected mode during which controller 1160 determines both the terrain type/condition and the current draft/implement. Such determinations may be made as described above. Controller 1160 may utilize both determinations to determine which of the data sets 751 of database 750, found in lead databases 1186, to use to select the chosen lead database based upon the current or anticipated rear speed RS.

Lead control system 1120 may be operable in an operator selected mode during which controller 1160 determines both geographic location of the 1110 and the current draft/implement. Such determinations may be made as described above. Controller 1160 may utilize both determinations to determine which of the data sets 851 of database 850, found in lead databases 1186, to use to select the chosen lead based upon the current or anticipated rear speed RS.

Lead control system 1120 may be operable in an operator selected mode during which controller 1160 selects one of the lead maps 902, found in lead maps 1188, based upon the current anticipated rear speed based upon the current or anticipated rear speed RS. Control 1160 may further determine the geographical location of vehicle 1110 (in a manner as described above) to determine in which region of the particular map 902 vehicle 1110 currently resides. Based upon the current region 904 in which vehicle 1100 currently resides in the particular map 902, controller 1160 may select the chosen lead.

Lead control system 1120 may be operable in an operator selected mode during which controller 1160 selects one of the lead maps 1002, found in lead maps 1188, based upon a combination of both the current or anticipated rear speed of vehicle 1110 and the determined draft or implement type/state. The draft or implement type and such or state may be determined in a manner as described above. Lead control system 1120 may further determine the geographical location of vehicle 1110 (in a manner described above) to determine the region of the particular map 1002 in which vehicle 1110 currently resides. Based upon the current region 1004 in which vehicle 1110 currently resides in the particular map 1002, controller 1160 may select the chosen lead.

Lead control system 1120 may be further operable in a user selected mode during which controller 1160 determines different tractive efficiencies associated with different vehicle leads when operating under certain conditions. The determined tractive efficiencies may be used to populate lead database 1186 and lead maps 1188, wherein the traction are empirically determined by vehicle 1110. In such a mode, controller 1160 determines and records, in real-time, different tractive efficiencies for different leads for each of multiple different rear speeds of the vehicle 1110.

Tractive efficiency (also referred to as traction efficiency), may be determined based upon the formula: (Ground speed*draft)/(torque*wheel speed). Controller 1160 may obtain values for the ground speed based upon signals from either location identification sensor 1172 or the radar-Doppler sensor 1184. Controller 1160 may obtain values for the draft based upon signals from draft sensor 1182 or the implement sensor 1170 and implement database 1180.

Controller 1160 may obtain values for the torque based upon signals received from current sensor 1194 (shown in FIG. 16) and/or strain sensors (StS) 1196 (shown in FIG. 16). Current sensor 1194 senses the current being drawn by electric motor 1232 to provide to rear wheels 1124 and front wheels 1126. Strain sensors 1196 sense the torque being applied to rear wheels 1124 and front wheels 1126.

Controller 1160 may obtain wheel speed values from rear speed sensor 1150 and/or front speed sensor 1154.

In some implementations, the controller 1160 may adjust the rear speed of the vehicle 1110 by outputting control signals to electric motor 1232 and transmission 1235, wherein for each individual rear speed of the vehicle 1110, the controller may further adjust the speed of the front ground traction members or wheels, by providing control signals to modulate the hydraulic motor 1242 to provide different leads. For each of the leads at each individual rear speed, controller 1160 may utilize ground speed, draft, torque and wheel speed data (discussed above) to determine the resulting tractive efficiency. In such an implementation, the controller 1160 may generate a table or database identifying different tractive efficiencies for different leads for each of the different rear speeds.

In some implementations, the controller 1160 may record the different tractive efficiencies for the different leads for each of the different rear speeds with different draft values, such as when the vehicle is pulling different implements or providing different drafts, producing a database that further takes into account the particular draft being pulled by the vehicle. In some implementations, the controller 1160 may record the different tractive efficiencies for the different leads for each of the different rear speeds when the vehicle traveling at different geographic locations or is traveling across different terrains having different soil conditions and/or types, producing database that further takes into account the particular terrain or condition of the underlying terrain or soil. Such databases may be provided as part of lead databases 1186 and may be subsequently utilized by other vehicles of the same type or may be used as a basis for the selection of chosen leads for other or different types of vehicles.

In operator selected modes, controller 1160 may determine tractive efficiency based upon a measurement of fuel or battery power consumption. Controller 1160 may receive control signals indicating the rate at which charge is drained from battery 1230. In such an implementation, controller 1160 may determine tractive efficiency by evaluating how much fuel or battery power was consumed by the vehicle 1110 to pull implement 1233, providing a given load or draft, at a particular ground speed (as determined based upon signals from sensor 1170 to or 1184). This evaluation may be done for each evaluated wheel speed and each of the leads being evaluated for each wheel speeds. The results may be recorded to form a database of leads. As described hereafter, the results may be further conditioned or based on variations in the implement being towed (variations in the draft), variations in the geographic regions in which vehicle 1110 is operating, and/or variations with respect to the underlying terrain.

Each of the above example implementations has been described in the context of measuring tractive efficiencies and/or automatically selecting and executing a vehicle lead based upon such tractive efficiencies. In other implementations, such implementations may alternatively or additionally provide an operator with the ability to the vehicle measures traction and/or automatically selects and executes a vehicle lead based upon such tractions or traction levels. In other words, traction, rather than traction efficiency, is the target variable. Lead will be selected to optimize the traction, rather than the traction efficiency, for the vehicle.

Maximum traction can be determined, similarly, but based on the maximum readings of the draft sensor until the draft stops increasing and levels off or goes down. Maximum traction, or coefficient of traction, can be useful in momentary situations for the vehicle to deal with patches of hard soil. In such example implementations, lead control system 1120 may be operable in a operator selectable mode in which system 1120 consults databases or tables similar to those described above, but wherein the targeted variable is traction rather than traction efficiency. System 1120 may automatically output control signals causing the vehicle to provide a particular lead at a particular rear speed to achieve an optimum or maximum traction for the vehicle. As above, the database or tables may be based upon a single variable, such as rear speed (combined with default or standard variables such as draft, implement type or state, geographic region, tire pressure or terrain) or may be based upon combinations of multiple variables comprising one or more of rear speed, draft, implement type or state, geographic region, tire pressure and terrain.

Figure 18:
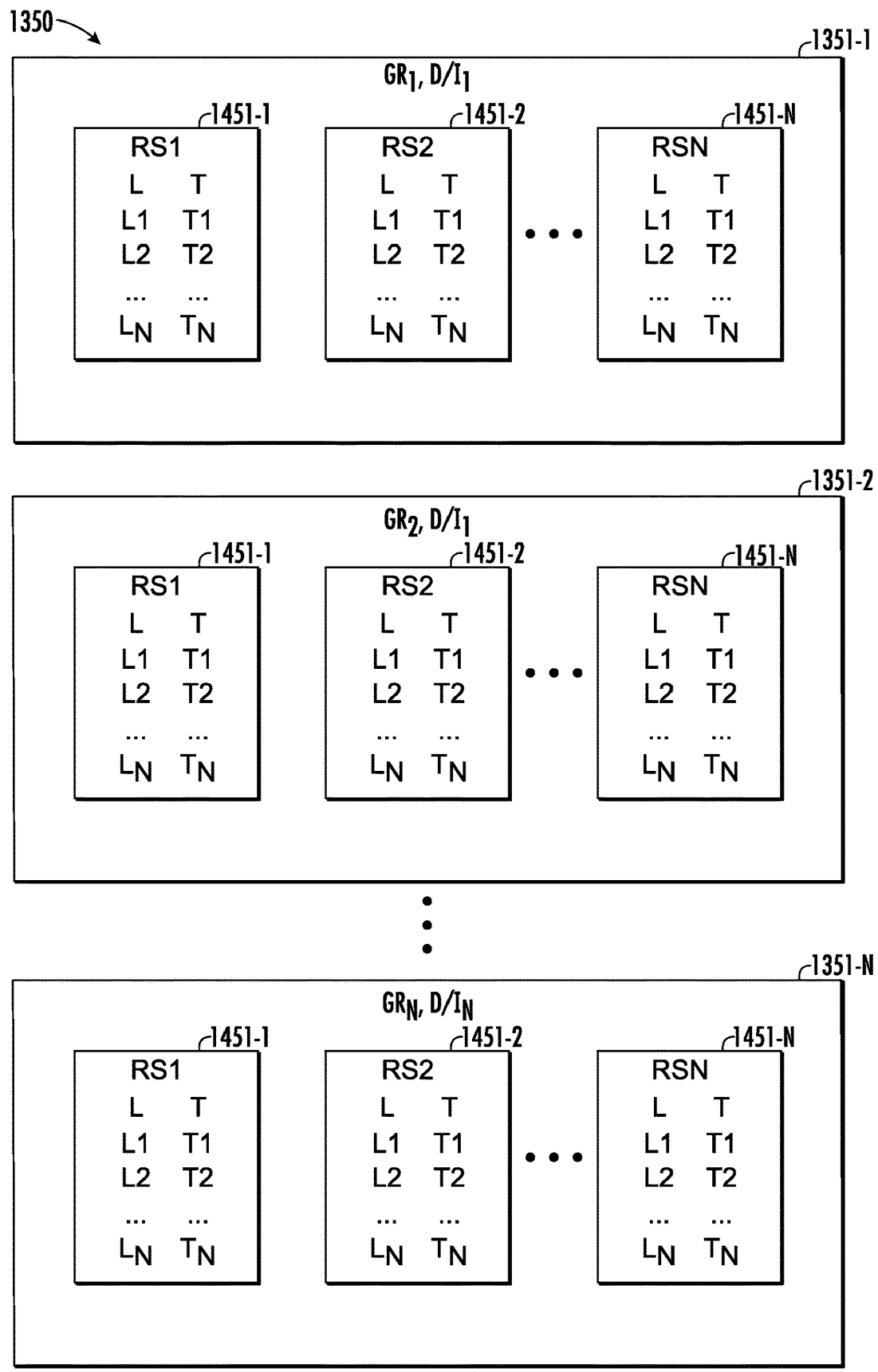
FIG. 18 is a diagram schematically illustrating an example database of leads and corresponding tractions for different rear speeds in different geographic regions and with different drafts or implement types and/or states.

FIG. 18 is a diagram illustrating an example database 1350 comprising data sets 1351-1, 1351-2 . . . 1351-N (collectively referred to as data sets 1351). Each of data sets 1351 comprises values at a particular geographic region GR and with a particular draft or implement state/type D/I. Each of data sets 1351 comprises a set of tables 1451-1, 1451-2 . . . 1451-N (collectively referred to as tables 1451), wherein each of tables 1451 identify an associated traction T (rather than traction efficiency TE) for a particular vehicle lead L at a particular rear speed RS. Such values may be empirically determined and stored using default or standard variables for other conditions such as tire pressure, terrain type or the like. In a fashion similar to that described above with respect to selecting a lead based upon traction efficiency, system 1120 may likewise be operable in an operator selectable mode in which system 1120 alternatively identifies and implements a particular vehicle lead based upon the current geographic region, and draft/implement type, state to enhance or optimize traction for the vehicle.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle comprising:
   rear ground traction members;
   front ground traction members;
   a rear drive system to drive the rear ground traction members;
   a continuously variable speed front drive system to drive the front ground traction members;
   a rear speed sensor to output rear speeds of the rear ground traction members;
   a front speed sensor to output front speeds of the front ground traction members; and
   a controller to:
      select a chosen lead for a rear speed of the rear ground traction members based on evaluations of different tractive efficiencies for different leads for the rear speed; and
      output control signals to the continuously variable speed front drive system to drive the front ground traction members at the chosen lead.

2. The vehicle of claim 1 further comprising an operator interface to receive a ground speed input from an operator, wherein the rear speed is based upon the ground speed input.

3. The vehicle of claim 1, wherein the controller is configured to select the rear speed based upon different tractive efficiencies for different leads for each of multiple different rear speeds.

4. The vehicle of claim 1 further comprising a database comprising the evaluations of different tractive efficiencies for different leads for each of multiple different rear speeds.

5. The vehicle of claim 1, wherein the controller is configured to select the chosen lead additionally based upon a geographic location of the vehicle.

6. The vehicle of claim 5 further comprising a lead map identifying different recommended leads for the rear speed at different geographic locations, wherein the controller is configured to consult the lead map based upon the geographic location of the vehicle.

7. The vehicle of claim 1, wherein the controller is configured to select the chosen lead additionally based upon a current condition and/or type of terrain underlying the vehicle.

8. The vehicle of claim 7 further comprising a terrain map identifying different conditions and/or types of terrain at different geographic locations, wherein the controller is configured to consult the terrain map based upon a geographic location of the vehicle.

9. The vehicle of claim 1, wherein the controller is to output a recommendation for the chosen lead to an operator, wherein the control signals are output in response to further operator interface.

10. The vehicle of claim 1, wherein the controller is configured to automatically output the control signals in response to the selection of the chosen lead.

11. The vehicle of claim 1, wherein the controller is configured to select the chosen lead additionally based upon a current draft of the vehicle.

12. The vehicle of claim 11 further comprising a draft sensor to output signals to the controller indicating the current draft of the vehicle.

13. The vehicle of claim 11 further comprising an implement identification sensor to output implement identification signals to the controller, wherein the controller is configured to identify an implement currently attached to the vehicle and to determine the current draft of the vehicle based upon the implement currently attached to the vehicle.

14. The vehicle of claim 1, wherein the controller is configured to select the chosen lead based upon an implement attached to the vehicle.

15. The vehicle of claim 1, wherein the controller is configured to determine and record the evaluations of different tractive efficiencies for different leads for each of multiple different rear speeds.

16. The vehicle of claim 15 further comprising:
a ground speed sensor to output signals indicating a ground speed of the vehicle; and
a torque sensor to output signals indicating torque applied to the rear ground traction members and the front ground traction members,
wherein the controller is configured to determine the evaluations of different tractive efficiencies for different leads for each of multiple different rear speeds based upon different ground speeds of the vehicle, different torques applied to the rear ground traction members and the front ground traction members, different draft values for each of the different leads for each of the multiple different rear speeds.

17. The vehicle of claim 15 further comprising a draft sensor for outputting signals indicating the different draft values.

18. The vehicle of claim 15 further comprising an implement sensor for outputting signals indicating an identification of an implement attached to the vehicle and/or a state of the implement, the implement and/or a state of the implement corresponding to a particular draft value.

19. The vehicle of claim 1, wherein the controller is configured to determine and record the evaluations of different tractive efficiencies for different leads for each of multiple different rear speeds.

20. The vehicle of claim 1, wherein the continuously variable speed front drive system comprises:
an electric motor;
a hydraulic pump driven by the electric motor; and
a hydraulic motor driven by the hydraulic pump and operably coupled to the front ground traction members by a planetary gear assembly, the planetary gear assembly comprising:
a sun gear coupled to and driven by the hydraulic motor;
a ring gear coupled to and driven by the electric motor; and
a planet carrier carrying planet gears intermeshing between the ring gear and the sun gear, the planet carrier having an output shaft operably coupled to the front ground traction members to drive the front ground traction members.

* * * * *